United States Patent
Rink et al.

(10) Patent No.: US 7,229,560 B2
(45) Date of Patent: Jun. 12, 2007

(54) SACK-BASED PROCESSES FOR RECOVERING OIL FLOATING ON WATER

(75) Inventors: Glenn R. Rink, Scottsdale, AZ (US); James F. Morris, Tucson, AZ (US); Stephen C. Stelpstra, Tucson, AZ (US); Robert L. Rosania, Bensalem, PA (US); Jan R. Hegeman, Seattle, WA (US); Peter A. Allen, Calistoga, CA (US)

(73) Assignee: AbTech Industries, Inc., Scottsdale, AZ (US)

( * ) Notice: Subject to any disclaimer, the term of this patent is extended or adjusted under 35 U.S.C. 154(b) by 54 days.

(21) Appl. No.: 11/006,354

(22) Filed: Dec. 6, 2004

(65) Prior Publication Data

US 2005/0151289 A1    Jul. 14, 2005

Related U.S. Application Data

(60) Division of application No. 10/396,020, filed on Mar. 24, 2003, now Pat. No. 7,048,878, which is a division of application No. 10/038,461, filed on Dec. 31, 2001, now Pat. No. 6,723,791, which is a continuation of application No. 09/005,332, filed on Jan. 9, 1998, now Pat. No. 6,344,519.

(60) Provisional application No. 60/034,677, filed on Jan. 10, 1997.

(51) Int. Cl.
*E02B 15/04* (2006.01)
*C02F 1/68* (2006.01)

(52) U.S. Cl. ............ 210/693; 210/923; 210/924; 210/925; 210/502.1

(58) Field of Classification Search ............... 210/693, 210/923, 924, 925, 502.1
See application file for complete search history.

(56) References Cited

U.S. PATENT DOCUMENTS

| 248,559 A | 10/1881 | Jackson |
| 425,641 A | 4/1890 | Van De Walle |
| 530,816 A | 12/1894 | Wright |
| 543,740 A | 7/1895 | Kuhns |
| 1,032,700 A | 7/1912 | Pickett |
| 1,164,527 A | 12/1915 | Kelly, Jr. |

(Continued)

*Primary Examiner*—Chester T Barry
(74) *Attorney, Agent, or Firm*—Louis J. Hoffman

(57) ABSTRACT

One or more water- and oil-porous containers or sacks are made of a pair of mesh sheets affixed together and stiffened around their perimeter. The sacks can be partially filled with a multitude of tubular bodies made of an oil-entrapping polymer, which have their longest dimension parallel to an axial hole. A preferred material is composed of a combination of SBS and EPDM, formed by an extrusion technique, to create highly fissured generally cylindrical bodies. The sacks may be deployed in areas where oil is floating on water, such as where oil has spilled from tankers on oceans, seas, lakes, or rivers. When the bodies are afloat, oily water can pass through the axial holes of and around the bodies, maximizing the surface area contacted by the oil and minimizing gel blocking. After a time sufficient for the bodies in the sacks to adsorb oil, the sacks can be collected. Various deployment and collection methods are disclosed. After collection, the oil may be recycled; alternatively the sacks may be incinerated, to recover the energy content for use as power while disposing of the oil.

73 Claims, 11 Drawing Sheets

U.S. PATENT DOCUMENTS

| | | | |
|---|---|---|---|
| 1,274,227 A | 7/1918 | Woodson | |
| 1,363,792 A | 12/1920 | Johnston | 210/164 |
| 1,471,819 A | 10/1923 | Bauschard | |
| 1,935,642 A | 11/1933 | Laughlin | 210/45 |
| 1,972,513 A | 9/1934 | Drehmann | 182/31 |
| 2,102,310 A | 12/1937 | Egan | 182/2 |
| 2,182,795 A | 12/1939 | Day | 182/31 |
| 2,467,021 A | 4/1949 | Fischer | 210/44 |
| 2,557,079 A | 6/1951 | Cutri | 294/77 |
| 2,615,526 A | 10/1952 | Lane | 182/2 |
| 2,813,745 A | 11/1957 | Frieder et al. | 294/77 |
| 2,889,928 A | 6/1959 | Sisk | 210/163 |
| 3,147,216 A | 9/1964 | Oemler | 210/693 |
| 3,221,888 A | 12/1965 | Muller | 210/333 |
| 3,246,582 A | 4/1966 | Wade | 94/33 |
| 3,324,630 A | 6/1967 | Teller et al. | 55/90 |
| 3,415,745 A | 12/1968 | Isaacson | 210/54 |
| 3,494,862 A | 2/1970 | Horowitz | 210/693 |
| 3,518,183 A | 6/1970 | Evans | 210/40 |
| 3,536,616 A | 10/1970 | Kondoh et al. | 210/693 |
| 3,537,587 A | 11/1970 | Kain | 210/242 |
| 3,538,020 A | 11/1970 | Heskett et al. | 210/496 |
| 3,539,013 A | 11/1970 | Smith | 210/242 |
| 3,565,257 A | 2/1971 | Cavalieri | 210/242 |
| 3,567,660 A | 3/1971 | Winkler | 260/2.3 |
| 3,594,335 A | 7/1971 | Schultz et al. | 260/2.5 |
| 3,607,741 A | 9/1971 | Sohnius | 210/242.4 |
| 3,607,793 A | 9/1971 | Mahlman | 260/93.7 |
| 3,617,565 A | 11/1971 | Fahlvik | 210/691 |
| 3,617,566 A | 11/1971 | Oshima et al. | 210/242.4 |
| 3,667,235 A | 6/1972 | Preus et al. | 61/1 |
| 3,667,608 A | 6/1972 | Burroughs et al. | 210/242 |
| 3,679,058 A | 7/1972 | Smith | 210/242 |
| 3,681,237 A | 8/1972 | Orban | 210/680 |
| 3,702,657 A | 11/1972 | Cunningham et al. | 210/242 |
| 3,713,539 A | 1/1973 | Thompson et al. | 210/164 |
| 3,739,913 A | 6/1973 | Bogosian | 210/924 |
| 3,756,948 A | 9/1973 | Weinberg | 210/693 |
| 3,783,621 A | 1/1974 | Preus et al. | 61/1 F |
| 3,800,950 A | 4/1974 | Hess et al. | 210/242.4 |
| 3,831,760 A | 8/1974 | Economy et al. | 210/242 |
| 3,837,494 A | 9/1974 | Stevenson | 210/259 |
| 3,868,322 A | 2/1975 | Orloff | 210/108 |
| 3,888,766 A | 6/1975 | DeYoung | 210/693 |
| 3,915,859 A | 10/1975 | Sundin et al. | 210/104 |
| 3,916,969 A | 11/1975 | Auerbach et al. | 152/354 |
| 3,923,472 A | 12/1975 | Martinez et al. | 44/50 |
| 3,929,631 A | 12/1975 | Winkler | 210/36 |
| 4,002,177 A | 1/1977 | Rainer et al. | 131/10 R |
| 4,031,839 A | 6/1977 | Pedone | 114/270 |
| 4,039,489 A | 8/1977 | Fletcher et al. | 210/924 |
| 4,052,306 A | 10/1977 | Schwartz et al. | 210/242 S |
| 4,060,487 A | 11/1977 | Samsel | 210/923 |
| 4,061,807 A | 12/1977 | Shaler et al. | 210/502 |
| 4,065,923 A | 1/1978 | Preus | 61/1 F |
| 4,070,287 A | 1/1978 | Wiegand et al. | 210/693 |
| 4,084,380 A | 4/1978 | Hallhagen | 61/1 F |
| 4,099,619 A | 7/1978 | Hudler et al. | 206/524.1 |
| 4,102,783 A | 7/1978 | Zenno et al. | 210/36 |
| 4,111,813 A | 9/1978 | Preus | 210/282 |
| RE29,996 E | 5/1979 | Jordan et al. | 210/281 |
| 4,206,080 A | 6/1980 | Sato et al. | 252/430 |
| 4,207,378 A | 6/1980 | Klein | 428/402 |
| 4,248,758 A | 2/1981 | Wright | 260/33.6 |
| 4,261,823 A | 4/1981 | Gallagher et al. | 210/164 |
| 4,264,444 A | 4/1981 | Bronnec | 210/923 |
| 4,332,854 A | 6/1982 | Parker | 210/924 |
| 4,366,067 A | 12/1982 | Golding et al. | 210/67 I |
| 4,401,475 A | 8/1983 | Eriksson et al. | 210/924 |
| 4,419,232 A | 12/1983 | Arntyr et al. | 210/164 |
| 4,420,400 A | 12/1983 | Weitzen | 210/710 |
| 4,427,157 A | 1/1984 | Klein | 210/160 |
| 4,429,065 A | 1/1984 | Gancy | 523/223 |
| 4,439,324 A | 3/1984 | Crotti | 210/924 |
| 4,454,039 A | 6/1984 | McCoy | 210/164 |
| 4,497,663 A | 2/1985 | Fisher et al. | 134/4 |
| 4,497,712 A | 2/1985 | Crowling | 210/242.4 |
| 4,519,431 A | 5/1985 | Yoshimura et al. | 152/209 R |
| 4,519,918 A | 5/1985 | Ericsson et al. | 210/680 |
| 4,560,718 A | 12/1985 | Rittchey | 524/13 |
| 4,592,690 A | 6/1986 | Busch | 413/19 |
| 4,594,157 A | 6/1986 | McGowan | 210/163 |
| 4,640,730 A | 2/1987 | Streets et al. | 156/334 |
| 4,672,781 A | 6/1987 | Pichon | 52/94 |
| 4,737,394 A | 4/1988 | Zafiroglu | 210/694 |
| 4,740,435 A | 4/1988 | Markin et al. | 429/174 |
| 4,776,722 A | 10/1988 | Gaudin | 405/25 |
| 4,801,386 A | 1/1989 | Sugimori et al. | 210/680 |
| 4,919,820 A | 4/1990 | Lafay et al. | 210/671 |
| 4,929,349 A | 5/1990 | Beckman | 210/151 |
| 4,941,978 A | 7/1990 | Gabrick | 210/693 |
| 4,965,129 A | 10/1990 | Bair et al. | 210/924 |
| 4,980,229 A | 12/1990 | Park et al. | 428/327 |
| 5,009,790 A | 4/1991 | Bustamante et al. | 210/242.4 |
| 5,032,640 A | 7/1991 | Fachini | 524/426 |
| 5,037,541 A | 8/1991 | Ruey-Jang et al. | 210/141 |
| 5,071,564 A | 12/1991 | Stein et al. | 210/924 |
| 5,075,014 A | 12/1991 | Sullivan | 210/776 |
| 5,104,548 A | 4/1992 | Gabrick | 210/680 |
| 5,133,619 A | 7/1992 | Murfae et al. | 404/4 |
| 5,135,578 A | 8/1992 | Billings | 210/924 |
| 5,135,660 A | 8/1992 | Chromecek et al. | 210/671 |
| 5,159,016 A | 10/1992 | Inoue et al. | 525/92 |
| 5,165,821 A | 11/1992 | Fischer et al. | 405/63 |
| 5,173,182 A | 12/1992 | Debellian | 210/170 |
| 5,179,611 A | 1/1993 | Umeda et al. | 385/110 |
| 5,180,704 A | 1/1993 | Reindl et al. | 502/402 |
| 5,181,802 A | 1/1993 | Thengs et al. | 405/70 |
| 5,186,831 A | 2/1993 | DePetris | 210/924 |
| 5,207,901 A | 5/1993 | Ravagnan | 210/173 |
| 5,211,858 A | 5/1993 | Dovan et al. | 252/8.551 |
| 5,223,154 A | 6/1993 | MacPherson, Jr. et al. | 210/790 |
| 5,227,072 A | 7/1993 | Brinkley | 210/924 |
| 5,232,587 A | 8/1993 | Hegemier et al. | 210/162 |
| 5,248,729 A | 9/1993 | Inoue et al. | 525/92 |
| 5,252,215 A | 10/1993 | McFarlane et al. | 210/69.1 |
| 5,256,226 A | 10/1993 | Marzola et al. | 156/95 |
| 5,278,217 A | 1/1994 | Umeda et al. | 524/394 |
| 5,281,463 A | 1/1994 | Cotton | 428/126 |
| 5,284,580 A | 2/1994 | Shyh | 210/163 |
| 5,297,367 A | 3/1994 | Sainz | 52/12 |
| 5,304,311 A | 4/1994 | Codiglia | 210/693 |
| 5,324,429 A | 6/1994 | Holland | 210/484 |
| 5,330,651 A | 7/1994 | Robertson | 210/617 |
| 5,360,548 A | 11/1994 | Stein et al. | 210/693 |
| 5,364,535 A | 11/1994 | Buckalew | 210/671 |
| 5,374,600 A | 12/1994 | Hozumi et al. | 502/402 |
| 5,391,295 A | 2/1995 | Wilcox et al. | 210/165 |
| 5,403,474 A | 4/1995 | Emery | 210/163 |
| 5,405,539 A | 4/1995 | Schneider | 210/747 |
| 5,407,575 A | 4/1995 | Vinsonhaler | 210/924 |
| 5,414,029 A | 5/1995 | Lemoine et al. | 524/60 |
| 5,423,985 A | 6/1995 | Addeo et al. | 210/924 |
| 5,427,679 A | 6/1995 | Daniels | 210/170 |
| 5,428,085 A | 6/1995 | Burel et al. | 524/59 |
| 5,432,000 A | 7/1995 | Young, Sr. et al. | 428/372 |
| 5,439,590 A | 8/1995 | Steffan | 210/616 |
| 5,468,539 A | 11/1995 | Crivelli | 428/141 |
| 5,480,254 A | 1/1996 | Autry et al. | 404/2 |
| 5,496,865 A | 3/1996 | Heese et al. | 521/79 |
| 5,511,904 A | 4/1996 | Van Egmond | 405/52 |
| 5,516,845 A | 5/1996 | Heese et al. | 525/193 |
| 5,573,349 A | 11/1996 | Paoluccio | 405/52 |
| 5,575,925 A | 11/1996 | Logue, Jr. | 210/747 |

| | | | |
|---|---|---|---|
| 5,624,576 A | 4/1997 | Lenhart et al. | 210/767 |
| 5,632,889 A | 5/1997 | Tharp | 210/165 |
| 5,641,847 A | 6/1997 | Hozumi et al. | 526/328.5 |
| 5,679,246 A | 10/1997 | Wilcox et al. | 210/165 |
| 5,707,527 A | 1/1998 | Knutson et al. | 210/660 |
| 5,712,358 A | 1/1998 | Sojka | 526/323.2 |
| 5,720,574 A | 2/1998 | Barella | 405/52 |
| 5,725,782 A | 3/1998 | Chinn et al. | 210/767 |
| 5,733,445 A | 3/1998 | Fanelli | 210/164 |
| 5,744,048 A | 4/1998 | Stetler | 210/803 |
| 5,762,790 A | 6/1998 | Zoeller | 210/238 |
| 5,767,060 A | 6/1998 | Hanrahan | 210/502.1 |
| 5,788,849 A | 8/1998 | Hutter, Jr. et al. | 210/163 |
| 5,820,762 A | 10/1998 | Bamer et al. | 210/661 |
| 5,824,400 A | 10/1998 | Petrakis et al. | 428/218 |
| 5,830,967 A | 11/1998 | Sojka | 526/323.2 |
| 5,834,577 A | 11/1998 | Sojka | 526/323.2 |
| 5,849,198 A | 12/1998 | Sharpless | 210/693 |
| 5,863,440 A * | 1/1999 | Rink et al. | 210/693 |
| 5,869,555 A | 2/1999 | Simmons et al. | 524/229 |
| 5,925,241 A | 7/1999 | Aldridge et al. | 210/163 |
| 5,955,552 A | 9/1999 | Sojka | 526/88 |
| 5,958,226 A | 9/1999 | Fleischmann | 210/165 |
| 5,985,157 A | 11/1999 | Leckner et al. | 210/747 |
| 6,080,307 A | 6/2000 | Morris et al. | 210/163 |
| 6,086,758 A | 7/2000 | Schilling et al. | 210/164 |
| 6,099,723 A | 8/2000 | Morris et al. | 210/170 |
| 6,106,706 A | 8/2000 | Roy et al. | 210/99 |
| 6,106,707 A | 8/2000 | Morris et al. | 210/163 |
| 6,143,172 A * | 11/2000 | Rink et al. | 210/237 |
| 6,214,216 B1 | 4/2001 | Isaacson | 210/162 |
| 6,231,758 B1 | 5/2001 | Morris et al. | 210/163 |
| 6,261,444 B1 | 7/2001 | Forse | 210/163 |
| 6,344,519 B1 * | 2/2002 | Rink et al. | 525/97 |
| 6,531,059 B1 | 3/2003 | Morris et al. | 210/164 |
| 6,541,569 B1 | 4/2003 | Morris et al. | 525/97 |
| 6,712,976 B2 | 3/2004 | Manzone | 210/668 |
| 6,723,791 B2 * | 4/2004 | Rink et al. | 525/97 |
| 7,048,878 B2 * | 5/2006 | Rink et al. | 264/41 |

* cited by examiner

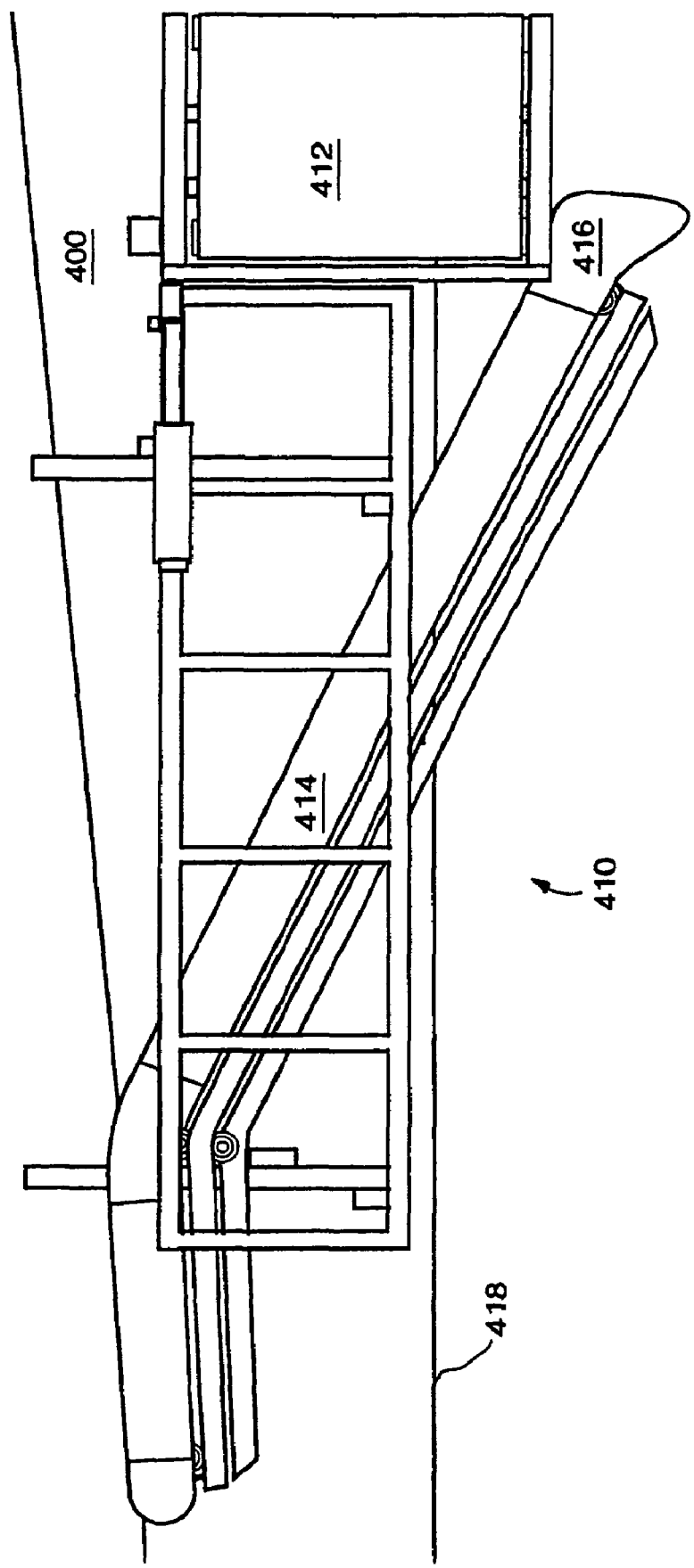

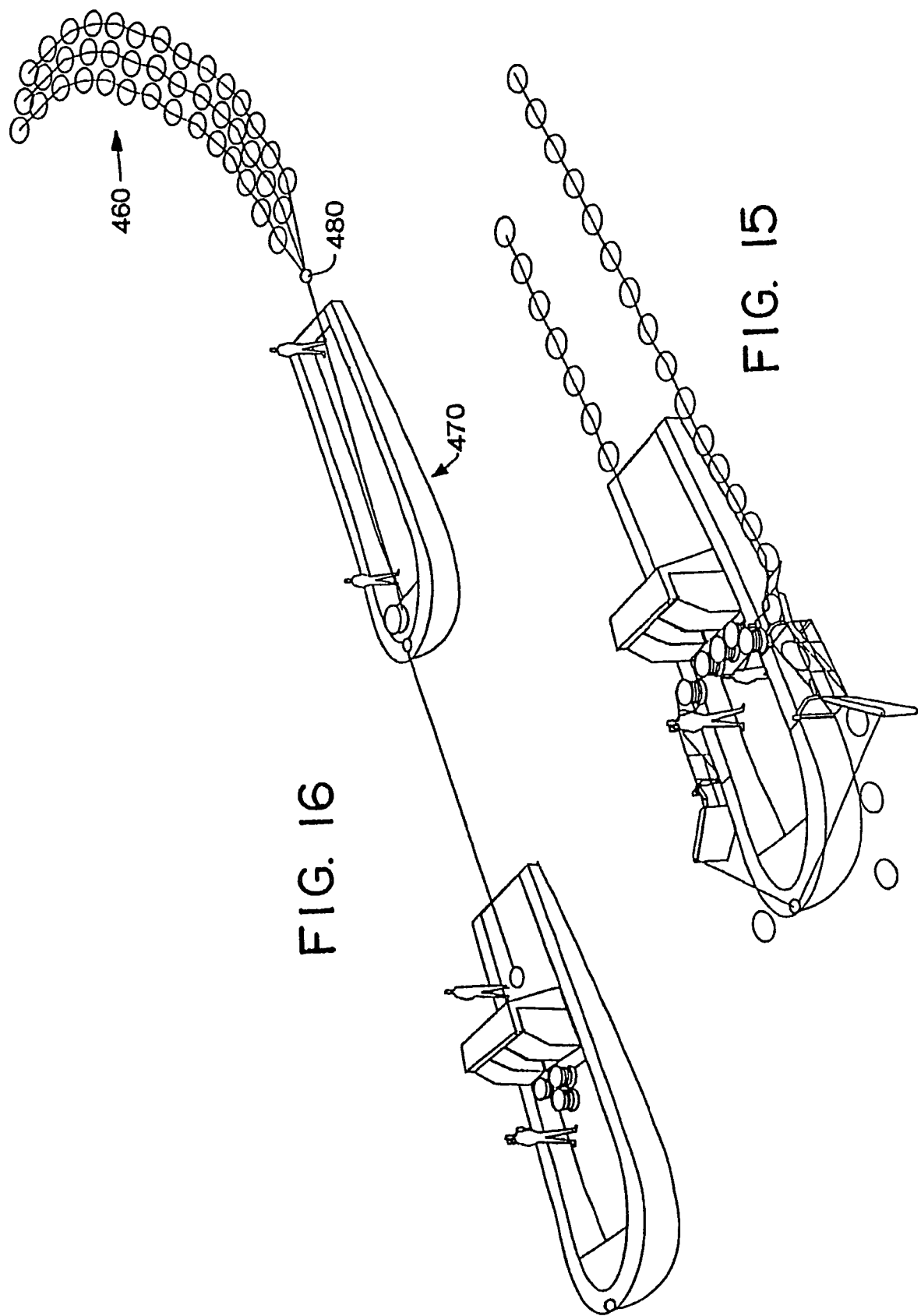

SACK-BASED PROCESSES FOR RECOVERING OIL FLOATING ON WATER

CROSS-REFERENCED RELATED APPLICATIONS

This application is a division of application Ser. No. 10/396,020, filed Mar. 24, 2003, now U.S. Pat No. 7,048,878 which is a division of application Ser. No. 10/038,461, filed Dec. 31, 2001, now U.S. Pat. No. 6,723,791, which is a continuation of application Ser. No. 09/005,332, filed Jan. 9, 1998, now U.S. Pat. No. 6,344,519, which claims the benefit of U.S. Provisional Application No. 60/034,677, filed Jan. 10, 1997.

FIELD OF THE INVENTION

This invention is in the field of systems and methods for recovering hydrocarbons from water, including oil spills on open-water surfaces such as the ocean.

BACKGROUND OF THE INVENTION

The continuing incidence of oil spillage into both marine and inland waterways due to shipping accidents results in enormous annual costs both financially to the shipping and insurance industries and environmentally. Many spill incidents occur in bad weather or in remote locations. Current systems for ameliorating oil spills require that specialized spill-response ships containing unique heavy equipment reach the site of the spill quickly, which requires relatively calm waters. There is a limited number of units of specialized equipment, and they are not easily transported. Thus, in many cases, response to the spill is delayed for many hours or even days. The impact of a spill is greatly increased by both bad weather and delayed response. Spill damage can be mitigated if response is rapid, even in rough-water conditions.

An additional problem is the high cost of disposal of the recovered material. Current recovery systems create large quantities of waste, which must be disposed of as hazardous waste at high financial cost. This problem can be solved by employing a system that allows for recycling, reclaiming, or low cost disposal.

Known systems for the clean-up of oil spilled on water fall into two categories: (1) absorption or adsorption (sorbing) of the oil, or (2) skimming of the oil, typically in conjunction with containment.

Many materials are known to be oil-absorbent or oil-adsorbent, such as wood chips, activated carbon, wool, cotton balls, corn husks, duck feathers, and various synthetic polymeric materials. A number of polymeric materials (polypropylene, polyester, polyurethane, vinyl polymers, and others) are known to absorb or adsorb crude or refined oil. Systems for applying these materials to oil spills are less developed. Application of materials to oil have been largely limited to two types: (1) spraying particles of the oil-sorbing material on the spill, or (2) placing the material inside booms or other barriers that surround the spill.

Either method creates severe collection problems for sorbent material in particulate form, including sinking of the oil-loaded material, loss of the oil-loaded material due to dispersion by wave or wind action, and dissolution of the oil-sorbent material in the oil spill. These problems are exacerbated when the spill occurs in bad weather or near shorelines. In addition, because 90% of spilled oil is typically located in 10% of the spill area, the dissolution problem can be particularly troublesome inside barriers. Further, the application of oil-sorbing material typically employs spill boats, which rely on availability of the boat and access to the spill. Both of these can be a severe problem in remote locations or bad weather.

Containers for oil-sorbing materials are known. These systems generally employ pillow or bale shaped containers. However, these containers have a tendency to pile up on top of each other, creating an undesirable condition in which a significant amount of the sorbent material is either below the waterline or floating above the oil, in either case out of contact with the oil. In addition, the large cross section of these types of containers tends to result in an "oil lock-out" phenomenon, in which the surface of the material becomes saturated with oil, effectively preventing oil migration to the center of the material. These containers also have a propensity for folding over on themselves in heavy seas, thereby reducing the contact between oil and the sorbent material.

On the other hand, oil-containment systems utilize booms to surround the spill until the oil can be collected. Boom systems have a number of designs, some of which employ oil sorbent materials in their construction. However, oil-sorbent booms are not designed to sorb substantial amounts of oil, but rather are generally used to retrieve a sheen or a small oil spill or to prevent the spill from expanding or reaching a protected area such as a shoreline until it can be collected by mechanical means, typically utilizing skimmers or oil-recovery boats.

Containment systems employing traditional booms have numerous problems. Deployment of some booms requires specialized equipment, which can be slow and difficult. If the spill is large, surrounding the spill may not be possible due to lack of sufficient boom resources. All of these problems can delay response to the spill. Therefore, boom and skimmer systems do not work well in rough water or near obstacles.

Delayed response to a spill results in a number of deleterious changes. A spill spreads uncontrollably and rapidly to a thin layer on water (less than 1 mm in many cases), making containment extremely difficult if not impossible. If close to shore, the oil may wash ashore, causing severe environmental damage. Lighter fractions of the oil (volatile organic compounds) are released into the atmosphere, resulting in hydrocarbon air pollution. The oil will undergo aging and emulsification, which can cause the oil to sink, making cleanup even more difficult. All of these changes cause the cleanup of the spill to become much more difficult, increase the environmental impact, and raise the financial cost of the cleanup.

There has been a need for some time, therefore, for an oil-recovery system that would (1) permit faster response, (2) work better in adverse conditions, such as rough water or near shorelines and obstacles, (3) prevent more of the oil from sinking, (4) contain the extent of the oil spill more quickly, (5) permit easier and more flexible deployment, (6) allow for easier collection, (7) permit economical recycling or disposal of the collected oil, and better protect the environment.

Accordingly, it is a primary object of the present invention to achieve a more effective system for recovering oil from the surface of bodies of water, such as oceans, lakes, or rivers.

It is another object of the invention to provide methods and apparatus for applying oil-absorbent or oil-adsorbent materials to an oil spill quickly and easily, accurately, and with minimal disturbance of the environment.

It is another object of the invention to provide methods and apparatus for effectively containing water-borne oil spills, even under adverse conditions or near shorelines, rocks, and reefs.

It is another object of the invention to provide methods and apparatus for ameliorating oil spills both by containment, such as within a barrier, and by entrapping the oil in an oil-sorbent material.

It is another object of the invention to provide a means of improving the collection of spilled oil.

It is another object of the invention to provide systems for controlling oil spills in areas of a body of water that are remote from collection vessels or in areas where shipping hazards or the oil itself prevent safe vessel operation, for later removal.

It is another object of the invention to provide collection systems that do not need to rely on the presence of specialized boats or vessels but can work with them.

It is another objective of the invention to provide systems for controlling oil spills that provide for the economical recycling of the collected oil as fuel.

It is another objective of the invention to provide systems for controlling oil spills that provide for the disposal of the oil through in-situ burning of the oil.

The present invention achieves the above and other objectives by use of a plurality of water- and oil-porous containers or sacks that are partially filled with a hydrophobic, compliant, oil-absorbent, copolymer material arranged in a number of bodies that (a) are generally cylindrical, (b) are porous, (c) have at least one passageway parallel to the axis of the cylinder, and (d) are dimensioned to float on water with the axis parallel to the surface of the water. The material is formed with a binder in a novel extrusion process. Optionally, a multitude of small flakes of a rigid, inert, smooth material having a surface that is wettable with respect to hydrocarbons are embedded in the bodies. Each sack is sewn in a novel way, with a perimeter stiffening ring, to retain a flat profile, and has a netting that closes to help inhibit outflow of the oil when the sack is retrieved. When deployed from ship or by air onto a spill, the sacks spread into a pancake shape and the copolymer bodies form a relatively thin layer that retains the oil. The inventive sacks will float indefinitely without releasing the oil or allowing it to emulsify, so the oil can remain in place until collection efforts are feasible. The sacks can be burned in situ, or standard fishing boats or specialized collection boats can be used to retrieve the sacks, and the collected material can be burned to capture the energy content of the oil or processed to separate the oil from the copolymer. The inventive sacks can be used in conjunction with other, known containment or retrieval equipment, such as booms or skimmers, if desired.

Thus, the inventive systems, devices, and methods can be used to permit (1) easy and quick deployment of containment equipment, even if a spill is in an inconvenient or distant location, (2) effective control of the spilled oil during any delays in recovery, and (3) comparatively inexpensive and easy collection of the oil during the clean-up stage. The system is specifically designed for rapid deployment and efficiency in rough water.

Other aspects of the invention will be appreciated by those skilled in the art after a reading of the detailed disclosure of the present invention below.

BRIEF DESCRIPTION OF THE DRAWINGS

FIG. 14 is a side view of a paravane assembly used with the embodiments of FIGS. 12 and 13.

FIG. 15 is a view of another alternative preferred embodiment of the collection system of FIG. 13.

FIG. 16 is a view of a subsequent collection operation used in connection with the collection systems of FIG. 13 or 15.

Common numerals are used in the several figures to indicate similar elements.

DETAILED DESCRIPTION

The system includes the application to the oil spill of hundreds or thousands of sacks containing a quantity of appropriately formed bodies comprising copolymer-based materials that are known to absorb and entrap crude or refined hydrocarbon products, including crude oil of any viscosity and gasoline or other refined fuels. For purposes of this application, the term "oil" refers to any hydrocarbon material.

Sack Deployment

Figure 1:
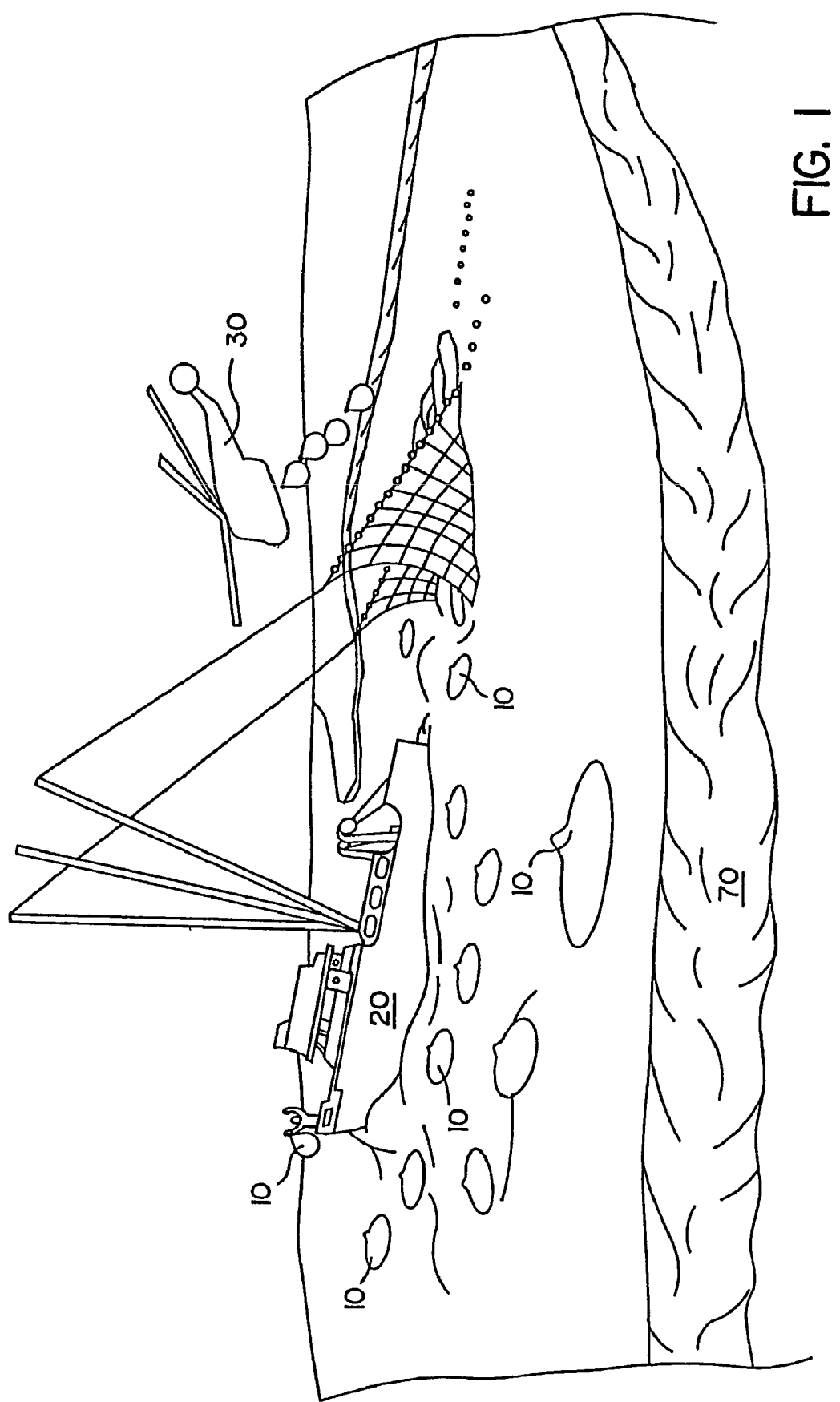
FIG. 1 is an illustration showing various aspects of the inventive system in use, particularly deployment and retrieval techniques.

FIG. 1 illustrates an oil spill and certain deployment and retrieval activities in accordance with the invention, including a plurality of the inventive containers, referenced as sacks 10. To simplify the application, a number of different activities are shown in FIG. 1, although in practice, many of those activities may take place at different times or in different locations. In FIG. 1, a number of sacks 10 are shown being applied to an oil spill. The containers are designed for easy application from floating platforms or ships, as shown at the left of FIG. 1, or from air, as shown at the right of FIG. 1. Although FIG. 1 illustrates application of sacks 10 from fishing boat 20, it is also possible to carry a quantity of sacks 10 aboard an oil tanker or other vessel (not shown) from which a spill might conceivably occur, as a precautionary measure.

FIG. 1 also shows a number of sacks 10 being dropped from helicopter 30 on a different part of the spill. The ability to deliver the sacks by air, such as from helicopters or light planes, or in bales from larger cargo planes, permits more rapid response to a spill, even if the spill is in a distant location or in a location that would be hazardous to approach by boat, such as in high seas, near reefs or other obstacles, in shallow water, or in the middle of a large spill. After all, open-ocean spills frequently occur in inconvenient locations or on rough seas. Also, air delivery allows application to a specific area of a large spill, which would be impossible for known sea-borne application methods. One specific area, usually near the center or leading edge of a spill, often contains 90% of the total oil in 10% of the geographic extent of the spill.

The fact that sacks 10 are easy to deploy also permits the most rapid possible form of response, namely delivery from the very tanker that has caused a spill. Known spill-control systems typically require complex, specialized equipment run by well-trained crews, and cannot be readily deployed from tankers. The inventive delivery system, by contrast, is simple enough to be deployed by tanker workers who are not skilled in handling spills, and inexpensive enough to be carried aboard tankers. It is not likely that an on-board tanker-delivery system can cure the entire spill, but prompt application of a quantity of sacks 10 can assist in the initial clean-up by reducing the extent of spreading and quantity of unrecovered oil.

As also shown in FIG. 1, at later stages of clean-up, booms 70, of the sort known in the prior art, can be deployed and used with sacks 10. However, sacks 10 can ameliorate even non-contained spills before booms 70 are deployed.

Sack Structure

FIGS. 2 through 9 illustrate preferred embodiments of sack 10.

Before deployment, sacks 10 are suitable for compact storage. As seen in the cross-section of the preferred embodiment of FIG. 3, each sack 10 is only partially filled, such that approximately 25–30% of the volume of the sack contains material that can entrap oil. Each sack 10 can be folded (not shown), such as with laces or ties, into a volume much smaller than the volume occupied by the sack when it is fully inflated. Bales of up to thousands of the sacks can be created.

In a preferred embodiment, each sack 10 may measure at least several feet across and contain from a few kilograms of material that can entrap oil to many tens of kilograms. Although larger sizes are also suitable, sacks 10 that measure less than a meter across have been found useful because of the ease of handling and flexibility of application. As shown in FIG. 1, a large quantity of sacks 10 can be deployed on an oil spill, as densely as economically possible. However, it is preferred to allow gaps between the sacks, to avoid their coming into contact with each other, which increases the chances that the oil will pass into contact with unused sorbent material. (In an alternative embodiment discussed below, where the sacks are formed into a boom, no gaps would be present, to form a continuous barrier.)

Figure 3:
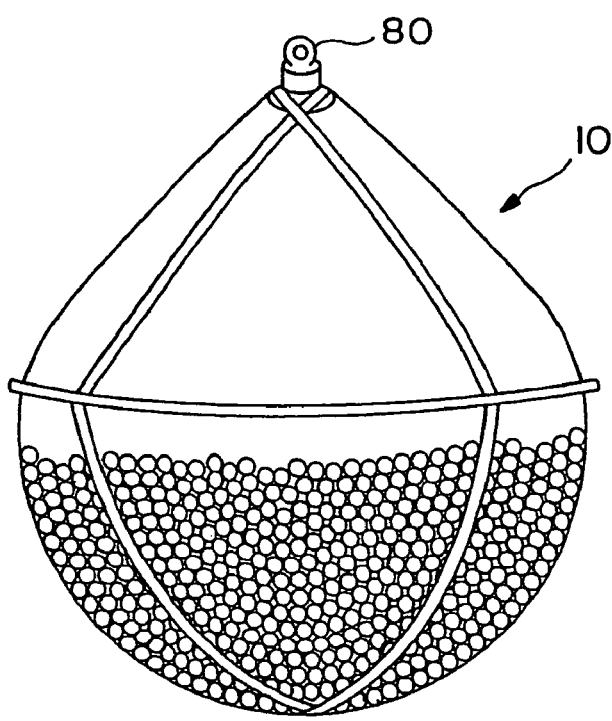
FIG. 3 is a perspective view of a preferred sack used with the inventive system, as it would appear before deployment.

FIG. 3 shows a cross-section of one such sack holding bodies of the oil-encapsulating copolymer. When deployed on open-water surface 50, however, sack 10 expands to a flat, pancake shape, as shown in the cross-section of FIG. 4. In that shape, the interior volume of sack 10 becomes smaller than the volume of the same sack in FIG. 3, so the material that can entrap oil may comprise approximately 80–85% of the volume, in a layer that is a few inches thick.

Figure 4:
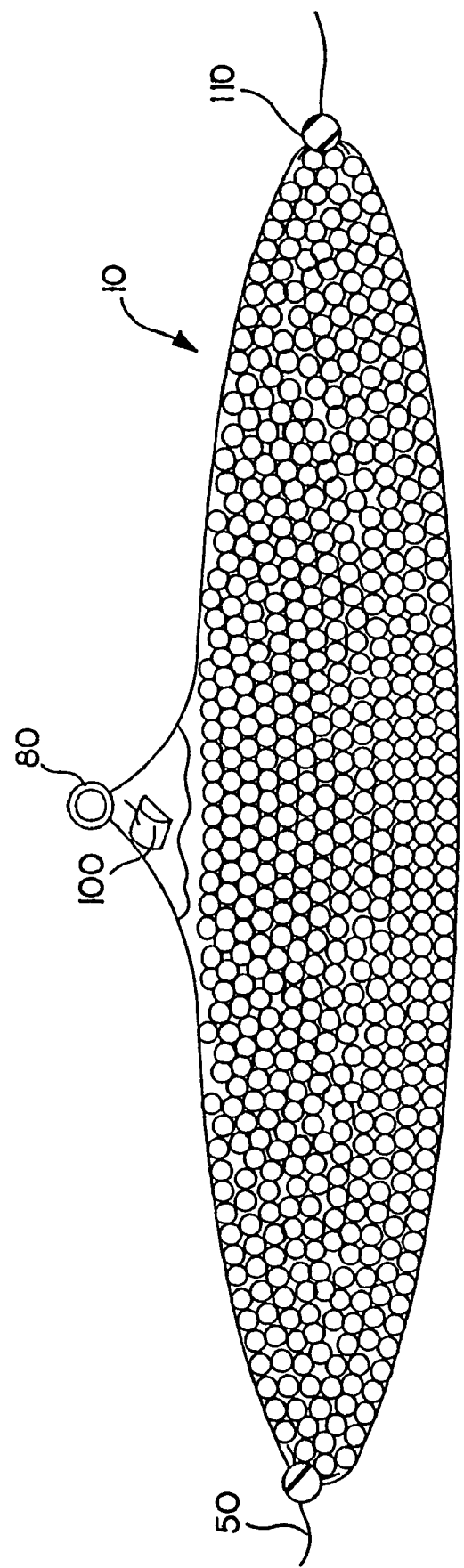
FIG. 4 is a side, cross-sectional view of the sack of FIG. 2, as it would appear after deployment on open water.

It has been found that sacks 10, when dropped onto open water 50, will quickly expand into the configuration shown in FIG. 4, because of the impact of the sack and subsequent wave action. Thus, sack 10 is designed to permit the material inside to spread out across the area covered by the sack relatively uniformly. It is not necessary, therefore, to take any positive action to ensure that the copolymer extends across the maximum possible extent.

Sacks 10 will float on the surface of the water, and oil coming into contact with the material contained inside sacks 10 will become entrapped by those copolymers. Because the copolymer material is hydrophobic, however, it will not become water-logged. It has been found that sacks 10 containing copolymers will float on the surface of water for at least several weeks, and perhaps indefinitely, without sinking, releasing the oil, or allowing it to emulsify.

The copolymer material in sacks 10 can be of one color, such as white, and change color, such as to black, when oil is entrapped therein. Further details of the copolymer material are specified below.

Figure 2:
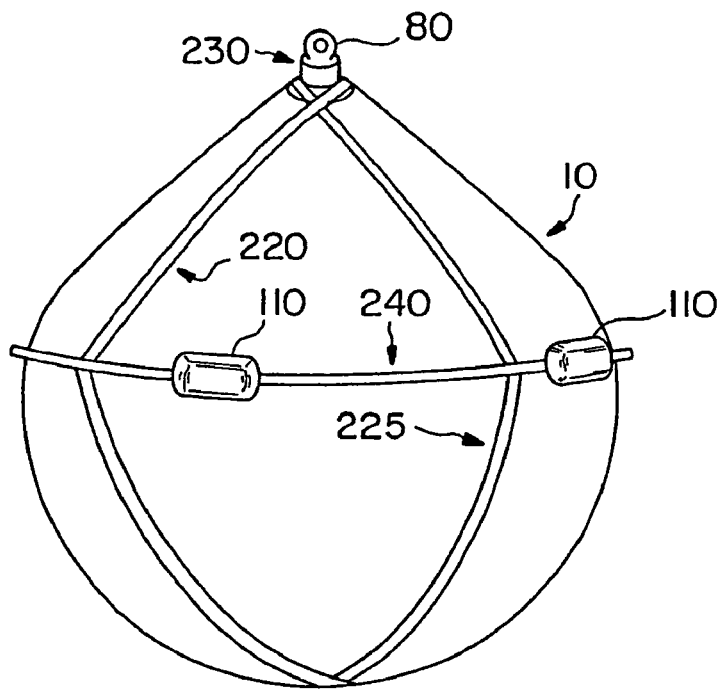
FIG. 2 is a perspective view of a preferred sack used with the inventive systems and methods, depicted in a state before the sack is deployed.

An optional feature shown in FIG. 2 is one or more buoyant elements 110, sewn to the material of sacks 10 at the level of the water-line. That feature assists in ensuring that sacks 10 have high visibility during prolonged periods on the spill. Also if other objects, such as a heavy type of cable, is attached to the sacks 10, the buoyant elements 110 can assist in helping the sacks remain afloat.

Another optional feature of sack 10 is a small radio transmitter 100, such as shown schematically in FIG. 4, which can emit a constant signal of pre-defined characteristics. Transmitters such as those used in scientific research to tag birds or animals are of one type that may be suitable. Alternatively, numeral 100 can comprise a patch of radar-sensitive material.

Such a location device 100 can permit prompt location of sacks 10 that have floated beyond the extent of the spill or otherwise been lost. Also, in cases where sacks 10 are dropped in a remote location by air, location device 100 can provide boats approaching a spill with easy navigational guidance, allowing recovery boats to locate the spill and other boats to avoid inadvertently sailing into the midst of the spill.

Figure 5:
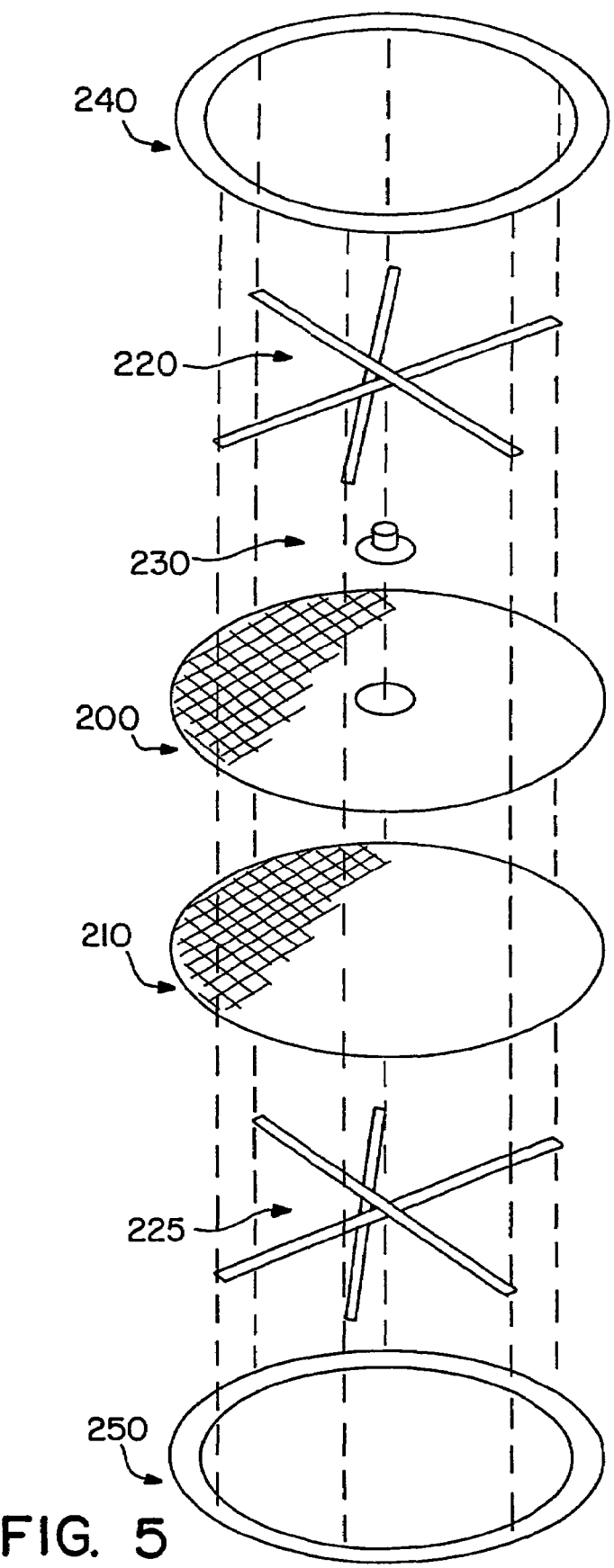
FIG. 5 is an isometric assembly diagram showing the elements of the preferred sack of FIG. 2.

FIG. 5 shows more details of the basics of a preferred embodiment of one of the sacks 10.

The outer material of sack 10 is formed from two layers 200, 210 sewn together. The copolymer-based material described below is placed inside sack 10 between those two layers. The layers 200, 210 can be formed of polypropylene, plastic, string or cord such as used in ordinary fishing nets, nylon, or another suitable material. In one suitable embodiment, a woven mesh formed of polypropylene was used. That material floats on water and is a strong material that is highly resistant to tearing, so if a small tear or rip opens, the material will resist its extension.

It is necessary, however, that the sack material have enough porosity to allow passage of the spilled oil to the absorbent material contained therein. Material having gaps of three eighths of an inch has been found most suitable, particularly for use on crude oil.

The necessary porosity of the sacks will depend, however, on the weight of the oil being collected. For example, a tight mesh may work on diesel or gasoline spills but not on heavier crude oil. In one test, a fabric measured as having air permeability of 150 cubic feet per minute at a half inch of water was found suitable for absorbing diesel fuel but not crude oil.

The material of the sack, however, must be sufficiently non-porous to contain the encapsulating copolymer matter. If the copolymer bodies specified below are used, even sack material having high porosity will be able to contain the absorbent material without leakage. Thus, larger bodies have the additional advantage of promoting the desirable goal of using high-porosity sack material, which permits better passage of oil.

Forming the outer material of sack 10 from two layers 200, 210 sewn together is particularly advantageous in helping sack 10 lay flat on the water, while also reducing the chance that the sack will fold over onto itself, which is undesirable because it limits the extent of sack 10. The flat configuration further assists in distributing the weight of the sack across its entire lateral extent, which helps in preventing bursting from concentrations of oil-filled copolymer at any particular point. The use of dual layers also promotes the wave action of the water helping to spread out the sack, as opposed to ordinary designs, in which wave action causes problems. Thus, use of the inventive system permits improved collection in actual conditions encountered in real oil spills.

Outside of layers 200, 210 are two webs 220, 225 formed of 1.5 inch wide polyester webbing. Material with a yarn count of 1,300 per inch and a breaking point of 4,000 pounds has been found more than sufficient for the loads encountered. For smaller sized sacks (three foot diameter or smaller), polypropylene webbing with a breaking point of 1,200 pounds can be used. Webs 220, 225 assist in preventing or limiting the extent of rips or tears in layers 200, 210.

Webbing rings 240, 250 are placed around the perimeter of sack 10 outside of webs 220, 225. Nylon webbing about 4 cm. wide with a warp yarn count of 1,680 per inch and breaking point of 6,000 pounds has been found suitable. Webbing rings 240, 250 hold the elements shown in FIG. 5 together while creating a stiffer edge of sack 10, which (as discussed above) helps allow sack 10 to lie flat in the water without folding over onto itself, even when dropped from the air from any original configuration. Webbing rings 240, 250 are narrow, to increase the encounter rate of the copolymer in still-water conditions. For smaller sacks, two-inch polypropylene webbing with a breaking point of 2,400 pounds can be used for webbing rings 240, 250.

If desired, during recovery, webbing rings 240, 250 can be hooked to pick up sacks 10.

The members of web 220 are sewn so as to leave an opening for the neck of flange 230, which can be made of hard plastic dip-molded material such as PVC. The base of flange 230 is attached between web 220 and layer 200, such as by sewing directly through the material of the plastic. Flange 230 is used as a port through which the copolymer material can be inserted into sack 10. The erect shape of the flange helps during retrieval.

Figure 6:
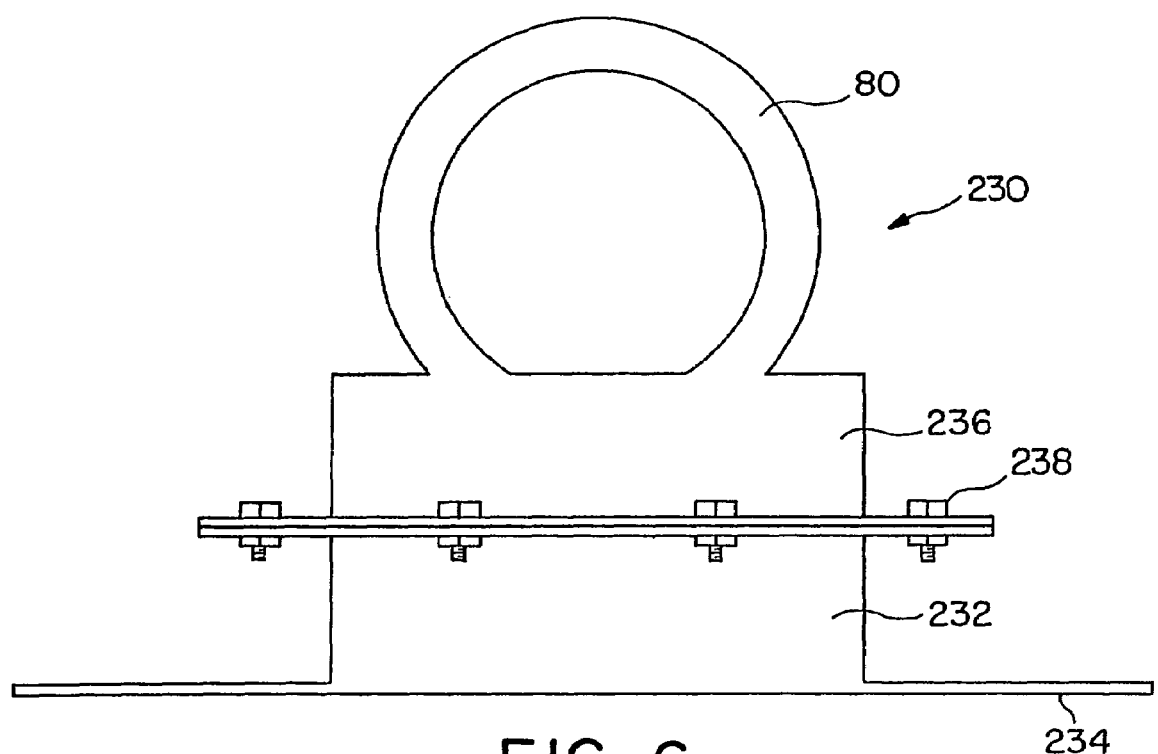
FIG. 6 is a side view of an optional flange used in the preferred sack of FIG. 5.

A closer view of flange 230 is shown in FIG. 6. Flange 230 has a neck 232 and a base 234, through which the sewing can be done. Cap 236 mates with neck 232, either with bolts and nuts 238, as shown, or through internal screw threads, not shown, or a combination of both. Eye 80 is formed, in the depicted embodiment, integrally with cap 236.

Shown in FIG. 2 are optional floats 110, which can also be attached near the ends of the members of webs 220, 225 of FIG. 5 to add additional buoyancy.

Internal dividers (not shown) can optionally be used to further assist in preventing accumulation of copolymer material at certain spots. Neon colors can be used on the webbing or rings to facilitate location of sacks 10 during retrieval.

Figure 7:
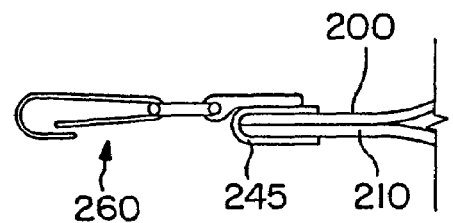
FIG. 7 is a cross-sectional view of the perimeter of an embodiment of the preferred sack of FIG. 5.

Webbing rings 240, 250 can also be formed of a single piece of material 245 that is folded over the edge of the perimeter of the assembly and stitched, forming a flat "U" shape in cross-section, as shown in FIG. 7.

Double and triple stitching, or zigzag stitching, techniques are preferably used to prevent seam rupture or load failures. The connector rings such as snap hooks 260 shown in FIG. 7 can be added to webbing rings 240, 250 near the ends of the members of webs 220, 225 and at the perimeter of webs 220, 225, to permit attachment of multiple sacks 10 together. When so attached, sacks 10 can be used as a boom substitute. To supplement the connector rings, ropes or cables can be added to assist in making deployment and retrieval adjustments without undue stress on the sacks 10.

Although FIG. 5 shows a circular-shaped sack 10, other configurations, such as square or rectangular, are also possible. Rectangular sacks are well suited for boom usage. When so used, the boom in accordance with the invention acts as a blanket, having a sizeable width to cover a large surface area. In this form, on the largest spills, the connected sacks can form a boom extending up to half a mile or so in length and holding up to 50,000 pounds of sorbent material. A boom of this sort is particularly useful to deploy in contact with the leading edge of the spill. In addition, double-width or wider booms can be configured easily by hooking additional rectangles together in multiple rows. Natural wave action works with such booms to prevent escape of oil, by spreading the oil across the width of the boom. By contrast, wave action hampers the effectiveness of prior art booms, including most with a "skirt" arrangement.

Also, booms of this sort can be deployed near shorelines, to prevent oil from reaching land, or directly on the shoreline at water's edge, to filter oil moving on shore or as oil returns to the water.

Figure 8:
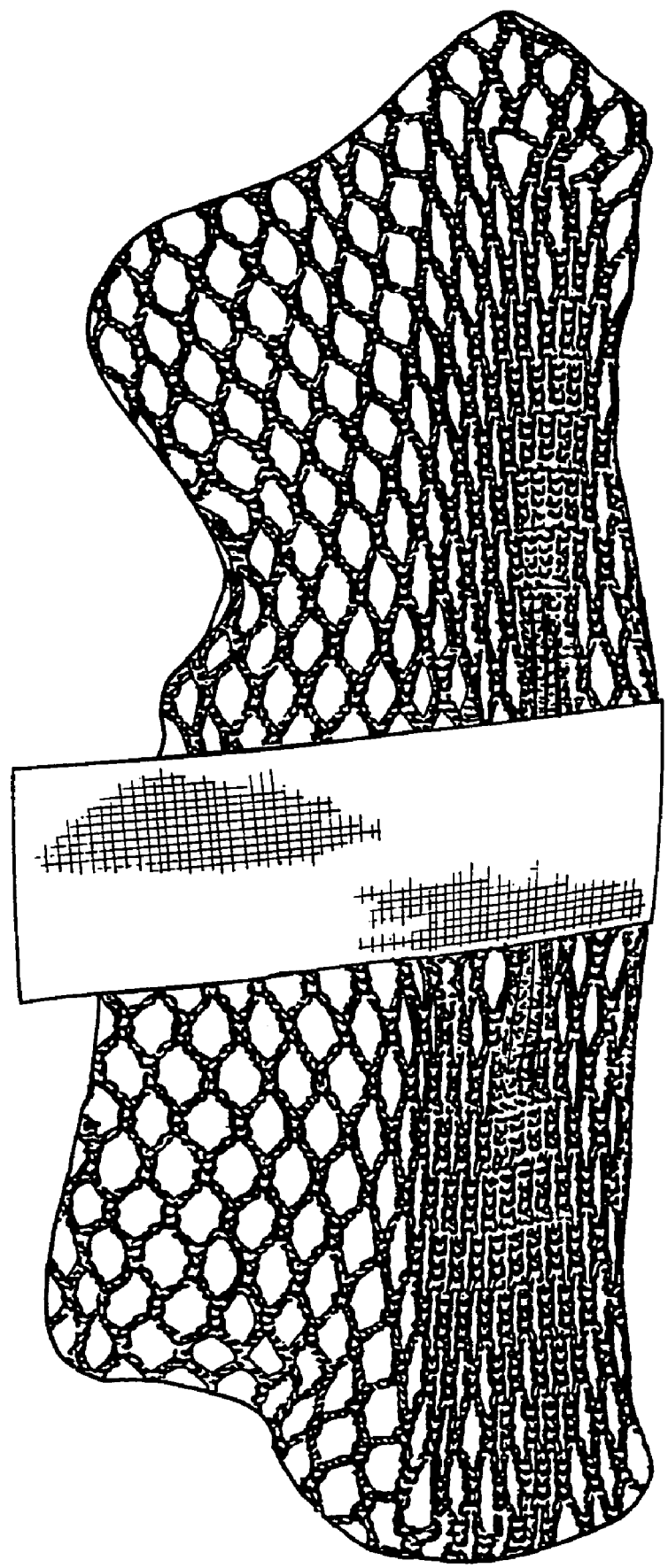
FIG. 8 is a view of a preferred way of attaching the webbing and mesh of the preferred sack of FIG. 5.

In a preferred embodiment, the members of webs 220, 225 are attached to the woven mesh of layers 200, 210. Specifically, the members are preferably oriented in the same direction as the major axes of the diamond-shaped holes formed by the mesh, which is usually perpendicular to the warp of the woven material of webs 220, 225. This preferred configuration is shown in FIG. 8. When sack 10 is picked up during retrieval with eye 80, the weight of the oil-filled bodies opposing the tension on the webbing members causes mesh 200, 210 to close in between those members, as shown in the lower half of FIG. 8. This facilitates the removal of sacks 10 containing the oil-logged copolymer-based material while also capturing excess oil not entrapped in the copolymer, or fragmented copolymer bodies, that are inside sack 10 at the time of retrieval.

The unique construction of the sort shown in the example of FIGS. 5–8 allows sacks 10 to expand on the surface of the water such that the formed copolymer bodies spread into a thin layer, creating a pancake shape and giving the sacks 10 minimal cross-sectional height on the spill, such as three inches. The arrangement limits the tendency of a sack 10 to fold onto itself, which can reduce the effectiveness of; the system. It also causes the copolymer bodies to disburse uniformly throughout the entire width of the sack 10, as the sewn layers of the sack prevent the sorbent material from forming into a pile, also improving effectiveness. Known containers tend to have bale-like or pillow-shaped appearances, which permit the sorbent material to form into a pile, creating the possibility of water-logged lower regions and upper regions that are out of the water. As a result, much of the sorbent material is positioned either above or below the oil slick in other known arrangements. Also, when the material becomes concentrated in a pile, the container can sink and interior parts of the material can be hidden, preventing them from encountering the oil.

The construction produces the flat profile in part for the following reasons: Webbing rings 240, 250 help flatten the profile of sack 10 by providing a stiff perimeter member. Also, in the circular arrangement, each segment of rings 240, 250 form a kind of an arch, creating tension that resists any tendency of webs 220, 225 to pull the perimeter radially inward.

The flat profile of sacks 10 therefore spreads the oil-absorbent copolymer material into an optimal position for encountering the oil; that is, in a flat layer on the surface of the water. The encounter rate of the sorbent material with the oil is vastly improved with the arrangement shown, as opposed to known containers.

The arrangement of the sacks 10 combines with the natural buoyancy of the copolymer bodies to allow sacks 10 to remain afloat on the surface of the water for long periods of time, such as weeks or months or more. In one test, sacks remained afloat and effective for 16 weeks. Even over such extended time periods, the sacks 10 will hold the material in a flat sheet fashion, whether or not the material has sorbed oil.

Figure 9:
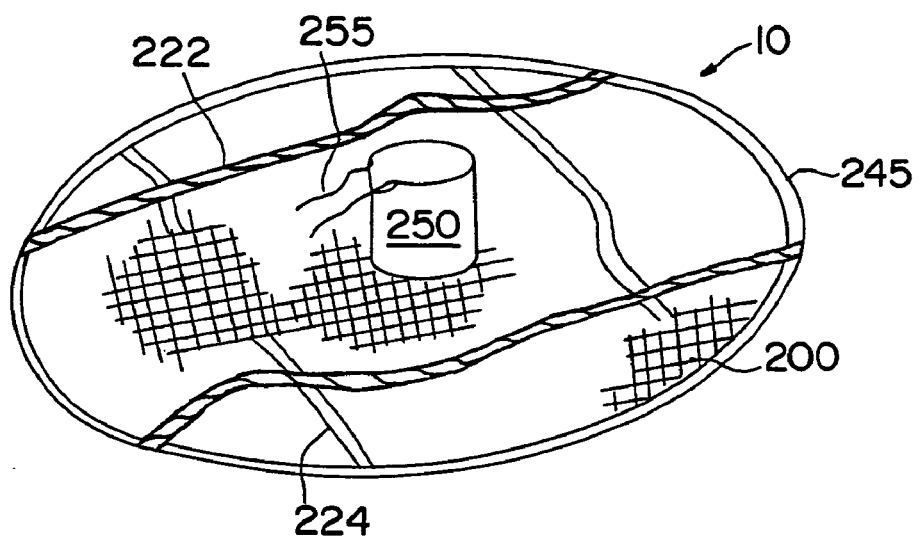
FIG. 9 is a partially broken-away perspective view of an alternative preferred sack, modified from the version of FIG. 5.

A modified sack 10 is shown in FIG. 9. The FIG. 9 version is particularly useful in waterway applications. The overwhelming majority of aqueous spills (such as 95%) occur in waterways other than open ocean, including harbors, rivers, and lakes. Although many waterway spills are much smaller than open-sea spills, the waterway spills are very frequent and collectively environmentally significant.

The configuration shown in FIG. 9 is particularly useful with smaller-sized sacks, such as sacks with diameters of about two-thirds of a meter, which might have a carrying weight of about 20 kg. of oil-soaked copolymer bodies.

Like the sack of FIG. 5, the sack of FIG. 9 includes two mesh layers 200, 210 (only 200 is clearly shown in FIG. 9) and a stiffening ring 245. Instead of heavy nylon rings 240, 250 (see FIG. 5), the sack of FIG. 9 uses a ring 245 made of a single piece of material (as in ring 245 of FIG. 7), formed from a mesh, such as a tape made of 14×12 count per inch, mesh vinyl-encapsulated polyester.

In place of webs 220, 225 consisting of diametric straps (see FIG. 5), sack 10 of FIG. 9 includes ropes 222, 224 positioned across non-diametric chords. Ropes 222 cross sack 10 on top of layer 200, while ropes 224 cross sack 10 in an opposing direction below layer 210. The ends of ropes 222, 224 are attached to ring 245.

In sack 10 of FIG. 9, ring 80 and fill tube 230 (see FIG. 6) have been replaced by a less expensive cloth collar 250, such as made of a 200-Denier nylon duck fabric. One end of collar 250 is sewn to the top mesh layer 200, while the other end is folded over itself and sewn, forming a passageway through which a drawstring 255 passes.

Cloth collar 250 can also be used to replace ring 80 and fill tube 230 in the embodiment of sack 10 shown in FIGS. 5 and 6. If it is desired to have a pick-up ring, such as ring 80 in that embodiment, a metal ring (not shown) can be affixed to the point where the radial members of web 220 meet at the center of mesh layer 200, and cloth collar 250 can be located at any other convenient place in mesh layer 200. Alternatively, the radial members of web 220 can be attached to the sack 10 except at the very center of layer 200.

The central ends of those radial members can be gathered together and attached to a metal ring, and cloth collar 250 can be affixed to the center of mesh layer 200, just below the ring.

Copolymer Bodies

Figure 10:
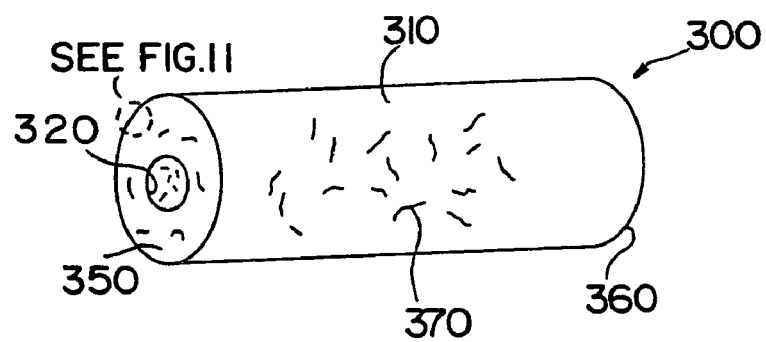
FIG. 10 is a perspective view of a preferred form of copolymer body used in the preferred sacks of FIGS. 2–9.

FIG. 10 shows an example of a suitably formed copolymer body 300, for use inside sack 10.

The principal ingredient of bodies 300 is a copolymeric material that is known to sorb oil but not water. Preferably, the material is compliant or flexible. A possible alternative to copolymers is natural or synthetic rubber, such as polyisoprene.

Particularly suitable types of copolymers fall within the class of thermoplastic elastomers, such as styrene-butadiene-styrene ("SBS"), which is a styrenic block copolymer. Styrenic block copolymers were developed for applications that require impact resistance, and this is still their primary use. SBS is highly sorbent, non-toxic, and remains coherent after it is oil saturated. An alternative styrenic block copolymer is styrene-isoprene-styrene ("SIS").

In a preferred embodiment formed in accordance with the preferred process described below, SBS material formed into granules is mixed with granulated binder material. In that embodiment, granular porous SBS with about 30% styrene has been found suitable, when sifted to retain particles in the range of sizes between 4 and 20 mesh. Preferably, the SBS product is manufactured without talc, contrary to the standard manufacturing process, to enhance inter-granular bonding in the formed body.

The binder material is a compliant or flexible, hydrophobic, olefinic polymer material in a granular form and having a melting point lower than that of the oil-absorbent copolymer. Polyolefin thermoplastic elastomers, such as ethylene propylene ("EP") rubber or ethylene propylene diene monomer ("EPDM") have been found suitable. The binder prevents formed bodies 300 from crumbling while being handled in dry form, yet also absorbs a certain quantity of oil, although perhaps not as fast as SBS.

An optionally third component of bodies 300 is a rigid, inert, smooth, thin flake of a material that has a surface that is wettable with respect to hydrocarbons. Any such material can be used, including mica, metal, or polymers, but polymethylpentene ("PMP") is a primary example. Alternative examples include polyethylene-terephthalate ("PET"), metallized polycarbonate, and polyvinylchloride. The flakes should be relatively thin, such as less than a millimeter thick. The shapes of the flakes is not particularly important, and good results have been achieved with randomly chopped material a few millimeters across. In some embodiments, the flakes enhance the flow of oil into the center of the formed copolymer body 300, apparently by providing a channel or surface along which the oil can flow. In other embodiments, including those formed in accordance with the preferred process described below, the flakes are not essential but can optionally be added.

In the preferred embodiment, 70–90% by weight of the material of bodies 300 consists of SBS and the remainder of EPDM binder. As explained below, the SBS and EPDM granules are mixed and formed into bodies 300 in a way that results in SBS granules in an EPDM matrix. If flakes are included, they might make up about 5% of the total weight.

Because of the desire, as noted above, to allow the copolymer material to remain in a flat layer, it is desirable to create a relatively large body 300, so that the material does not pile on top of itself. However, large bodies result in a greater distance between outer surface 310 and center surface 320, which is disadvantageous because oil would require a much longer time of exposure to soak into the center. Because in real oil spills, a particular quantity of oil may encounter body 300 only sporadically, in a large body, the center material largely remains unused.

A preferred embodiment that solves this dilemma uses a generally tube shape for bodies 300. For example, a cylinder with an outer diameter from about two to five centimeters has an hole about one to two centimeters in diameter along the longitudinal axis, resulting in a body 300 that has all of its material less than about a centimeter or two from the nearest surface.

The relatively large inner hole allows water and oil to pass through and between the bodies 300 easily, thereby improving the chances of oil encountering a copolymer surface. Also, removal of material from the center of body 300 reduces the amount of material in each body, without significantly reducing the quantity of oil absorbed, which further improves the quantity of oil entrapped per unit quantity of copolymer.

Multiple holes parallel to the cylinder's axis can be used in addition to the axial hole or instead of it. For example, in one arrangement (not shown) three holes are arranged on radial planes separated by 120° angles, the holes being equidistant from the axis of the cylinder. This arrangement permits enhanced flow-through of oil even if the oil layer does not intersect the cylinder along the axis, for example if some of the bodies 300 are partly submerged.

Bodies 300 should be formed with a length exceeding the outer diameter of the cylinder. This restriction is important, because it ensures that bodies 300 will float on the water with the axial hole parallel to the surface of the water, permitting better pass-through of oil. This is particularly important for bodies 300 used with the inventive sacks 10, because sacks 10 are designed to permit bodies 300 to float in a single layer, as discussed above. When afloat amidst oil, bodies 300 near the circumference of sack 10 tends to physically block oil from flowing to other bodies 300 closer to the center. The inclusion of axial holes, and their orientation parallel to the surface of the water, counteracts this tendency. In addition, in some circumstances, the preferred hole orientation permits more oil to remain inside the axial passageway, permitting more time to complete the absorption process.

Bodies 300 can be supplemented with different-shaped bodies in sacks 10. Using such a mixture of bodies 300 is advantageous over the use of a uniform type of body, because regular-shaped bodies can become arranged in a more fitted-together fashion, reducing the quantity of interstitial space, which thereby lowers the encounter rate.

The generally cylindrical exterior 310 of bodies 300 is preferred, as it reduces the area of contact between adjacent bodies 300. The pressure from many bodies 300 in sack 10 and the softness of the constituent materials tends to meld bodies 300 together, with the consequential tendency to lower the encounter rate. A reduced contact area counters this undesired effect.

Another undesired effect is called "matting" or "gel blocking," in which the first quantity of absorbed oil combines with an outer layer of grains in body 300 to form a barrier, preventing unabsorbed oil from continuing into the part to reach inner layers of grains and be absorbed thereby.

To increase the surface area of the bodies 300, consequently permitting faster oil absorption and less gel blocking, without increasing the distance from surface to center, it is desirable to have inner and outer surfaces 310 and 320 roughened somewhat. The same is true of end surfaces 350 and 360. The preferred process of formation discussed below promotes this goal. Alternatively, cutting or stamping bodies 300 from sheets of molded material has been found to roughen surfaces 310, 320, while first cutting the sheets from blocks roughens surfaces 350, 360. Also, the sheets or parts can be molded in a rough-sided dimple mold.

Also to reduce gel blocking, bodies 300 preferably have numerous fissures 370 extending into bodies 300 from some or all exterior surfaces and passing between the grains of SBS. Again, the preferred formation process discussed below promotes this goal.

In one example, a body 300 measuring about 3.5 cm. across and about 7.5 cm. long, with a 1 cm. diameter axial hole, was found suitable. That body 300 has a bulk density of about 0.62 g/cc and weighed, therefore, just over 40 grams. A sack 10 of 1.8 meters diameter can carry about 15 kg. of copolymer material, which represents nearly 400 units of the exemplary bodies 300. A sack 10 of two-thirds of a meter diameter can carry about 2 kg. of copolymer material, which represents about 50 units. The weight of the sacks after bodies 300 absorb oil is about an order of magnitude greater.

The bulk density of the resulting body is controlled, also to reduce gel blocking. With the preferred bulk density, the SBS granules in bodies 300 are also less likely to clump to each other when soaked with oil, which also improves sorbency. Similarly, the SBS grain sizes identified above are selected to avoid gel blocking from either overly large chunks or agglomerated small-diameter, powdery particles.

With the preferred materials discussed above, bulk density greater than 0.75 g/cc tend to prevent the oil from entering the bodies, while bulk density smaller than 0.45 g/cc cause the bodies to fragment, either when dry or after absorbing oil. For example, copolymer bodies with a bulk density in the preferred range have enough inter-granular voids to permit oil to penetrate substantially throughout the thickness of bodies 300 without causing them to fall apart.

Figure 11:
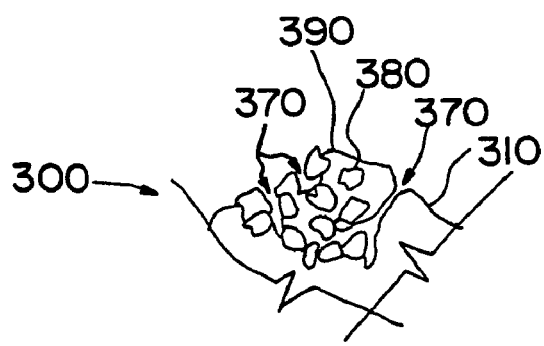
FIG. 11 is a detail view of a cross-section of the preferred body, such the one shown in FIG. 10.

Bodies 300 formed in accordance with FIGS. 10 and 11 can alternatively be used as oil-absorbent filters, such as in a cartridge or around a pipe or shaft. In this usage, because bodies 300 are physically held in position rather than floating, the length relative to the outer diameter is not critical and may be altered as needed. Similarly, the central hole may not be necessary.

In another extension of the inventive form, a structure (not shown) is formed of a number of bodies 300 arranged side-by-side, with longitudinal axes parallel to each other. To form such a structure, multiple bodies 300 can be affixed together, or the structure can be manufactured as a unitary sheet haying opposing top and bottom scalloped surfaces, with the holes located between the surfaces at the thicker regions.

Forming the Copolymer Bodies

One method of forming bodies 300 shown in FIG. 10 is to use low-pressure compression molding in the presence of elevated temperature. For example, pressures about 8–20 psi and temperatures about 150–200° F. have been found suitable to manufacture a product originally consisting of SBS and EPDM granules with high absorbency and high retained coherency after absorbing oil. The heat melts the EPDM, without melting the SBS granules, to agglomerate the material into a coherent assembly without damaging the physical structure of the SBS, thereby degrading that material's absorbency. A mold having a number of circular cavities can be used to form a number of bodies 300 at once.

Another, preferred method of forming bodies 300 applies a modified extrusion process. SBS and EPDM granules are placed in the hopper of an extruder of conventional design, for example, a two-inch Bonnot lab extruder with a hot-water external barrel heater. The extruder heats the granular material to a temperature not exceeding 120° F., far below normal extrusion temperatures for plastic products, and preferably not exceeding 105° F.

In the barrel of the extruder, the EPDM quickly become plasticized, as a result of heat, pressure, and mechanical agitation by the screw and barrel in combination. The extruder's screw mixes the plasticized EPDM and the unmelted SBS, forming a matrix of EPDM surrounding SBS granules. Because the SBS is not melted, some air bubbles remain in the mixture. The softening process occurs quite rapidly in the extruder, permitting very short dwell times (such as less than one minute), which permits rapid manufacturing.

The partially plasticized composite material is pressed through a circular die with a central rod or mandrel, to form the cylindrical structure with the axial hole shown in FIG. 10. In one example, a four-inch long die was used.

Upon passing through the die, the SBS granules, which have been compressed somewhat by being forced through the die, reexpand, "fluffing" the extruded material while it cools and hardens. The expansion is further assisted by air remaining in the mixture. The extruded material is cut into suitable lengths to form the final bodies 300.

When cooled and resolidified outside the extruder, the EPDM matrix 390 (see FIG. 11) forms a durable but permeable structure for the SBS granules 380 and provides mechanical integrity to the resulting bodies 300. Thus, bodies 300 formed in accordance with the preferred method do not break or crack absent extreme elastic deformation, despite the presence of fissures 370. Also, fragments of such bodies do not detach easily from bodies 300 in the form of flakes, crumbles, or dust, even with rough handling.

The fluffing effect (typically undesired in extrusion processes) is beneficial because it forms inter-granular fissures 370 in the EPDM matrix, throughout the structure. However, the fissuring is not so great as to cause loss of structural integrity. As noted above, fissures are preferred to facilitate rapid passage of oil into bodies 300 and to reduce the incidence of gel blocking, permitting continued absorption.

In bodies 300 formed according to the preferred method, any reduction in absorbency caused by the binder (compared to a body composed exclusively of higher-absorbent material, such as SBS) is more than offset by the increase rates of contact between oil and SBS caused by the fissuring and rough external texture and the reduced tendency to premature gelation.

Sack Collection

FIG. 1 also shows techniques of recovering sacks 10 after the copolymer bodies have been soaked with oil. Because the sacks float and stabilize the oil in self-contained and self-sustaining sacks, special equipment is not needed to collect the oil. For example, FIG. 1 shows an ordinary fishing trawler 20 using its net to scoop up quantities of oil-logged sacks 10. Although it is not required, the use of the inventive system does not preclude the utilization of more sophisticated collection boats, such as scoop boats or high-speed oil response vessels, such as known in the art. For example, if a large spill is contained in the vicinity of a base for such equipment, it may be advantageous to use such boats to collect sacks 10 at the same time as floating oil not yet held by sacks 10 is skimmed from the surface. It is also possible to fish sacks 10 out of the water using a hook.

Figure 12:
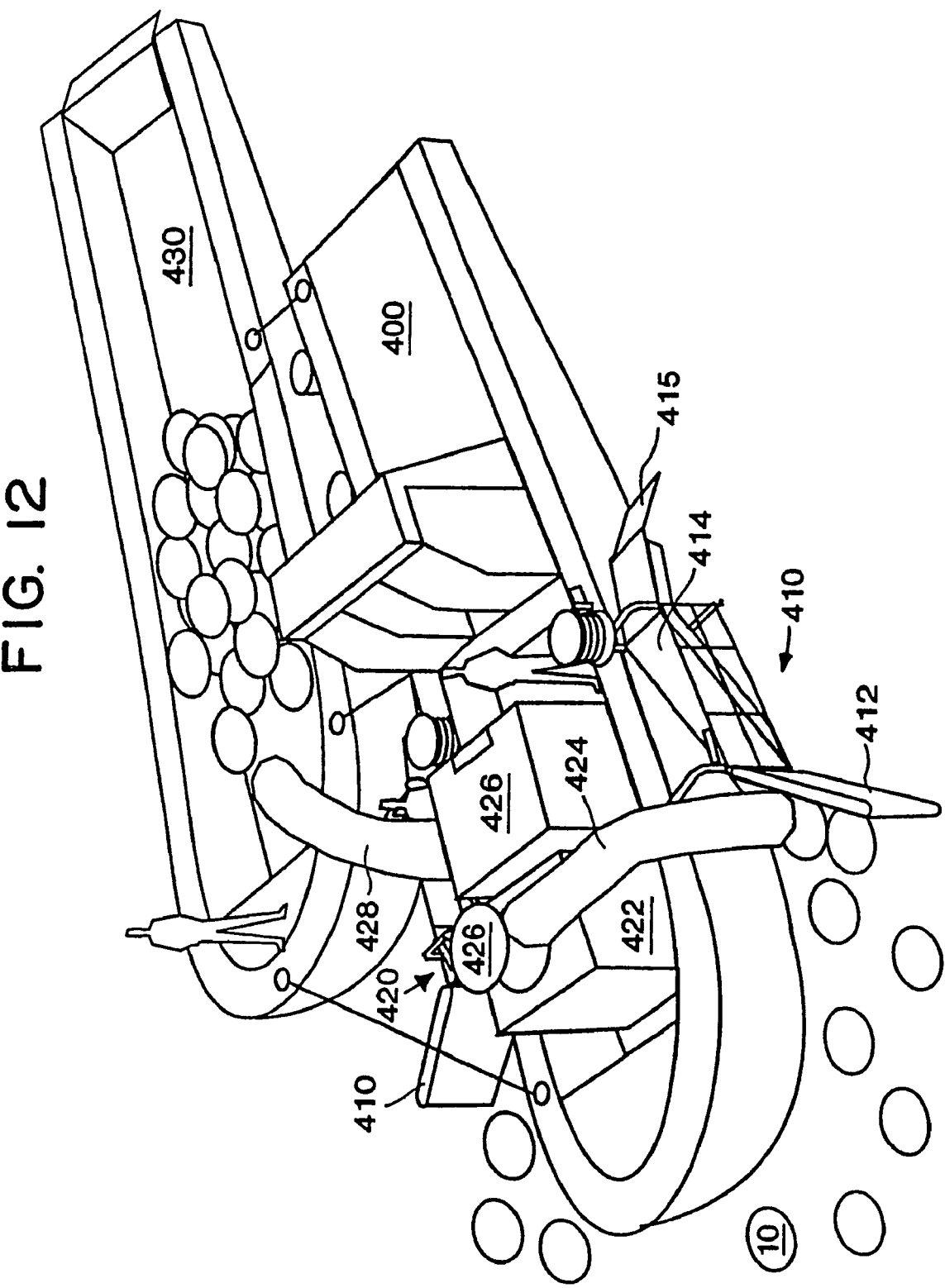
FIG. 12 is a view of a preferred embodiment of apparatus used to collect sacks of FIGS. 2–9.

FIG. 12 shows a collection method in which a specialized high-speed boat 400, such as a modified version of boats operated presently by Team One of Seattle, Wash., approaches the spill on a rapid-response basis. Specially fitted outrigger paravanes 410 are deployed upon arrival, and sacks 10 are collected in wings 412 of paravanes 410 as boat 400 slowly advances. In rough-water conditions, sacks 10 are dropped onto the spill or in advance of the spill by air. Because sacks 10 retain the oil indefinitely, boat 400 can wait until the rough-water conditions dissipate to arrive on the scene and complete containment and recovery procedures, without risking dissipation of the spill by winds and seas, thus minimizing environmental damage without risk to recovery boats and crews.

A vacuum airstream conveyance and transfer (VACT) system can be used to collect sacks 10 using airstream induction (as opposed to pure vacuum pressure). An example of such a system already on the market and known to the ordinarily skilled artisan is called the Linductor system, available from Linductor, Inc. of Seattle, Wash. This Linductor device was developed for transferring bulk solids or volumes of liquids, including removing spilled oil from the surface of water. It has been found that a VACT system that is a variant of the Linductor can be used to gather sacks 10 containing spilled oil more expediently in certain sea conditions. The Linductor system as marketed and if mounted on an appropriate vessel, such as a barge, is capable of picking up sacks up to three feet in diameter, but modifications can be made to allow pickup of larger sacks and conveyance on a smaller vessel.

Such a modified VACT system 420 is depicted in FIG. 12, including receiving tank 422, widened intake pipe 424, turret assembly 426, power and induction fan unit 426, and outlet pipe 428. Turret assembly 426 rotates to permit intake pipe 424 to be moved to any desired location next to the bow of boat 400. It is possible to configure a VACT system to use two intake pipes, one on either side of the bow (not shown). Outlet pipe 428 is optional, because sacks 10 can be retained in receiving tank or bladder 422, or an interior connection (not shown) at the bottom of tank 422 can allow sacks 10 to drop into a hold of boat 400, or an outlet ramp (not shown) on a side of tank 422 can allow sacks 10 to exit tank 422 and accumulate in an adjacent pile. In the configuration depicted in FIG. 12, however, sacks 10 are discharged through outlet pipe 428 and hurled through the air into a lightweight sled 430 towed along the side of boat 400. A powered barge can be used instead of a towed sled.

Figure 13:
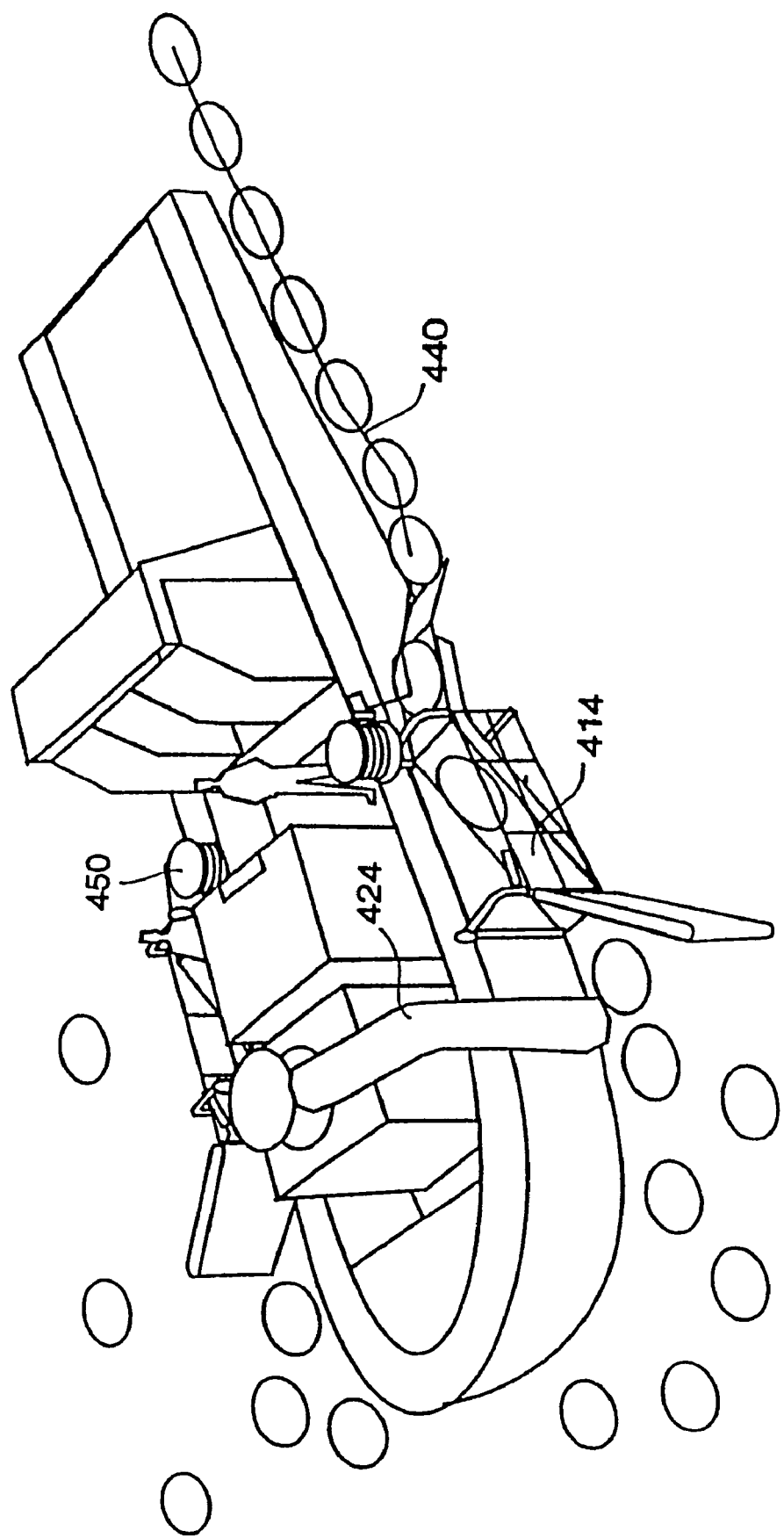
FIG. 13 is a view of an alternative preferred embodiment of the collection system of FIG. 12.

FIG. 13 shows laborers tying retrieved sacks 10 to lines or cables 440 pulled manually off of spools 450, to form towed strings of sacks that can be collected later. Those units of sacks 10 that miss intake pipe 424 are carried slowly up ramps 414 of paravanes 410 and attached manually to lines or cables 440, such as with snap hooks, after which they are slid back down to the water on a slide 415, such as made of stainless steel. FIG. 15 shows an alternative embodiment in which the VACT system is deleted, and manual collection and arrangement into strings is done exclusively.

FIG. 14 shows details of a hydraulically powered paravane 410, as viewed from the far side of boat 400 in FIGS. 12 and 13. Ramp 414 can be tilted from an initially horizontal travel position to drop scoop 416 below waterline 418. Thereafter, the hydraulic system can spread wings 412 from the travel position to the 45-degree angle shown in FIGS. 12, 13, and 15. Ramp 414 includes a powered conveyor, with a surface that can be made of a lightweight, wide mesh fabric, such as made of a Velcro material, that can grip and feed sacks 10 from scoop 416 up ramp 414. Although paravanes 410 are depicted as being supported by boat 400, they can alternatively be mounted on one or a chain of sleds, similar to sled 430, towed along the side of or behind powered boat 400.

In the collection methods depicted in FIGS. 13 and 15, after a quantity of sacks 10 are tied into a string, the line 440 can be cut and the chain of sacks released to allow it to float in the water. Then, a workboat can assemble a number of strings together and attach an anchor or buoy 480 to the group of strings, preferably by attaching it to the middle of each string, forming a streamer-like arrangement 460, shown in FIG. 16. Anchor or buoy 480 can support a radio transmitter-like element or radar-sensitive patch 100 in FIG. 4, for ease of later location, instead of that element being on each sack 10. Streamers 460 can remain afloat until a collection boat or towed sled 470 attaches a line to anchor or buoy 480 and pulls the assembly aboard. Once loaded, sled 470 with its chains of sacks 10 can be towed to shore with barges.

Disposal

The inventive configuration of sacks 10 permits a disposal method that has been considered desirable but which is difficult if not impossible to achieve in actual practice, namely in-situ burning on the water. In-situ burning prevents the need for the boat collection techniques described above.

Sacks 10, either alone or in assembled chains or "streamers," can be easily ignited on the water, which creates a wicking or torch effect, thereby burning not only the sacks but also unabsorbed oil surrounding the sacks. Previous attempts to burn oil spills on water have suffered from numerous difficulties, particularly the problems in ignition caused by rough water, thin oil slicks, or high emulsification. Various published articles have described prior attempts at in-situ burning and the problems faced by such attempts.

If sacks 10 are transported to dry land, they can be disposed of as waste with the oil still intact, but this is costly and environmentally not preferred. Alternatively, sacks 10 can be incinerated on land, and the energy content of the oil and copolymer can be recovered and used as power. To allow for such a disposal technique, it is preferred to use materials for the particles, for the outer material of sack 10, and for all other components of the sacks 10 that can be burned, to reduce the quantity of solid waste or air-borne pollution. The preferred materials specified in this description are so suited. Another recycling use for oil-logged copolymers is in road building.

Also, it is possible to remove the oil from the copolymer using various processes, to allow recycling of the oil with no remaining hazardous material (or possibly reuse of the copolymer product in sacks 10). For example, a fully automated process for extraction of refined oil from the copolymer bodies has been developed within a reactor unit originally formed to break down scrap tire chips into the resalable commodities of scrap steel, carbon black, and refined oil. The reactor heats the oil-soaked copolymer bodies in a sealed environment to break down the molecular structure of the copolymers. Such a reactor is a modification of a scrap-tire reactor commercially available from Tire Recycling Technologies Corporation of Albuquerque, N. Mex., called the TRTM-60 tire decomposition machine.

Certain modifications to the TRTM-60 can allow it to work on oil-soaked copolymer bodies, at a reasonable cost: (1) because of the salt content, a higher-grade stainless steel is preferred; (2) the discharge system is changed to eliminate the magnetic separator for carbon black and steel scrap, which is produced from scrap tire but not from copolymer bodies; (3) a second, liquid seal is used at the discharge end; (4) the air condenser is replaced with a second water condenser; and (5) two screw conveyor stages are used instead of five.

As thus modified, the reactor works as follows:

The copolymer bodies from sacks 10 are delivered to an inlet hopper of a sealed screw conveyor. Commercially available as a package with the TRTM-60 is information identifying certain additives that permit better breakdown of the scrap tire, and these additives are useful with the copolymer bodies as well.

Two enclosed, horizontally oriented, stainless-steel screw conveyors stages, powered by individual hydraulic drives and a central hydraulic pumping system, move the material including the copolymer bodies through the reactor while chemically breaking down the bodies while they are conveyed through the entire length. The conveyors have top inlets and discharge chutes at each end. The inlet connection to the reactor and the outlet side of the reactor are sealed, for example by liquid seals, to prevent oxygen from entering the process.

The reactor heats the material in a vacuum at 200–300° C. Each reactor conveyor has a perforated top to vent gases produced during the process. A vertical stainless steel plenum welded to each conveyor provides a means to collect these process gases. The gases are "pulled" off the top of the plenum by a turbine pump. The gas is then filtered to remove residue carried over from the reactor unit. The gases, consisting mostly of vaporized fuel oils, are then pumped through two separate condensing stages that are a water-cooled heat exchanger. Cooling is provided via an air-cooled process chiller with a circulating pumping system. Non-condensable gases are collected and recycled as the fuel medium for the burners, which can be used to maintain the temperature in the reactor unit or to power an electric generator, or can be discharged to a flare and burned.

Oil-soaked copolymer material processed in this fashion can yield much of the output as liquid hydrocarbons. Indeed, some of the resulting liquid consists of styrene, which if separated by distillation, is five to ten times more valuable than crude oil, and can improve the recycling economics. An additional portion of the total output consists of gaseous hydrocarbons, which can be further processed to a hydrocarbon mixture that can be used as clean-burning fuel for the recycling reactor. Yet another portion, generated from the ethylene components, consists of a waxy solid residue that has commercial application as a feed stock for chemical refineries. Optimally, virtually no char will remain.

Although the invention has been described with reference to specific embodiments, many modifications and variations of such embodiments can be made without departing from the innovative concepts disclosed. Thus, it is understood by those skilled in the art that alternative forms and embodiments of the invention can be devised without departing from its spirit and scope.

We claim:

1. A process for recovering oil floating on water comprising:
   (a) deploying onto oily water a plurality of sacks, each comprised of two sheets of a mesh material that is porous to both water and oil, which sheets are affixed together and stiffened around their perimeter;
   (b) wherein each sack forms a compartment containing a multitude of tubular bodies comprised of an oil-entrapping polymer; and (c) maintaining the sacks afloat amidst the oil for a time sufficient to allow the bodies in the sacks to entrap a quantity of the oil;

(d) wherein each of the multitude of polymer bodies is formed to surround an axial hole of the polymer body; and (e) wherein each of the multitude of polymer bodies has its longest dimension parallel to the axial hole.

2. The process of claim 1 wherein the act of deploying the sacks comprises dropping at least some of the plurality of sacks onto the oily water by air.

3. The process of claim 1 further comprising deploying the sacks inside a barrier enclosing an oil spill.

4. The process of claim 1 wherein the act of deploying the sacks comprises dropping at least some of the plurality of sacks onto the oily water from a vessel that is spilling oil onto the water.

5. The process of claim 1 further comprising retrieving the sacks from the surface of the water at least a day after the act of deploying the sacks.

6. The process of claim 1 further comprising retrieving the sacks from the surface of the water by netting the sacks with a net coupled to a boat.

7. The process of claim 1 further comprising retrieving the sacks from the surface of the water using an airstream induction system supported by a boat.

8. The process of claim 7 wherein using an airstream induction system includes hurling the sacks into a floating vessel towed by the boat.

9. The process of claim 1 further comprising retrieving the sacks from the surface of the water by moving through the water a boat that supports a pair of wings positioned at a forward angle from the sides of the boat, thereby funneling the sacks next to the sides of the boat.

10. The process of claim 9 wherein the act of retrieving the sacks further comprises power-conveying the sacks, after they are funneled next to the sides of the boat, up a ramp.

11. The process of claim 10 further comprising connecting a quantity of the sacks together with a line and returning the resulting string of sacks to the surface of the water.

12. The process of claim 11 further comprising attaching together a buoy and the string of sacks.

13. The process of claim 11 further comprising forming a plurality of strings of sacks and attaching together the strings and a buoy, and further comprising later collecting the plurality of strings of sacks as a unit.

14. The process of claim 1 further comprising connecting a quantity of the sacks together and burning the connected sacks, together with the oil entrapped by the polymer of the bodies, while the connected sacks remain afloat amidst the water.

15. The process of claim 1 further comprising burning the sacks together with the oil entrapped by the polymer of the bodies while the sacks remain afloat amidst the oily water.

16. The process of claim 1 further comprising retrieving the sacks from the surface of the water and later incinerating the sacks together with the oil entrapped by the polymer of the bodies and the bodies themselves.

17. The process of claim 1 further comprising retrieving the sacks from the surface of the water, and later heating the polymer bodies in a reactor to recover hydrocarbons.

18. The process of claim 1 wherein the act of deploying the sacks comprises using sacks having an eye coupled thereto, and further comprising retrieving the sacks by hooking the eye.

19. The process of claim 11 wherein the act of deploying the sacks comprises using sacks having an eye coupled thereto, and wherein the act of connecting the sacks together with a line comprises connecting the line to the eye of the sack.

20. The process of claim 1 wherein the act of deploying the sacks comprises using sacks having a port coupled thereto.

21. The process of claim 1 wherein the act of deploying the sacks comprises using sacks having a plurality of ropes coupled to the sack, each positioned across non-diametric chords of the sheets.

22. The process of claim 21 wherein the act of deploying the sacks comprises using sacks having a collar and a pick-up ring.

23. The process of claim 1 wherein the act of deploying the sacks comprises using sacks having a flexible ring affixed around the perimeter of the sheets of the sacks.

24. The process of claim 23 wherein the act of deploying the sacks comprises using sacks having the ring folded over and affixed to the outside of both sheets, thereby forming the ring into a double layer.

25. The process of claim 1 wherein the act of deploying the sacks comprises using sacks having two round sheets.

26. The process of claim 1 wherein the act of deploying the sacks comprises using sacks having two rectangular sheets, and further including attachment devices on each edge at the perimeter of the sack.

27. The process of claim 1 wherein the act of deploying the sacks comprises using sacks formed of sheets of a woven polypropylene mesh.

28. The process of claim 1 wherein the act of deploying the sacks comprises using sacks having a plurality of buoyant elements coupled thereto.

29. The process of claim 1 wherein the act of deploying the sacks comprises using sacks containing polymer bodies having a multitude of plastic fragments scattered throughout.

30. The process of claim 29 wherein the act of deploying the sacks comprises using sacks containing polymer bodies, wherein the multitude of plastic fragments are inert flakes wettable with respect to hydrocarbons.

31. The process of claim 29 wherein the act of deploying the sacks comprises using sacks containing polymer bodies comprising SBS and the plastic fragments.

32. The process of claim 1 wherein the act of deploying the sacks comprises using sacks containing polymer bodies comprised of EPDM and SBS.

33. The process of claim 1 wherein the act of deploying the sacks comprises using sacks containing polymer bodies consisting of EPDM and SBS.

34. The process of claim 33 wherein the act of deploying the sacks comprises using sacks containing polymer bodies having formed from a multitude of granules of styrene-butadiene-styrene and a multitude of granules of ethylene propylene diene monomer bound together.

35. The process of claim 33 wherein the act of deploying the sacks comprises using sacks containing polymer bodies having an outer diameter between two and five centimeters and an axial hole that has a width no more than two centimeters less than the outer diameter.

36. The process of claim 1 wherein the act of deploying the sacks comprises using sacks containing polymer bodies having external surfaces that contain a multitude of fissures.

37. The process of claim 36 wherein the act of deploying the sacks comprises using sacks containing polymer bodies substantially consisting of SBS and EPDM.

38. The process of claim 1 wherein the act of deploying the sacks comprises using sacks containing polymer bodies formed of a multitude of granules between 4 and 20 mesh of SBS agglomerated together.

39. The process of claim 1 wherein the act of deploying the sacks comprises using sacks containing polymer bodies having a density between 0.45 and 0.75 g/cc.

40. The process of claim 1 wherein the act of deploying the sacks comprises using sacks further containing a multitude of additional bodies not having axial holes, which are also comprised of an oil-entrapping polymer.

41. The process of claim 40 wherein the multitude of polymer bodies and the multitude of additional bodies both have surfaces containing a multitude of fissures.

42. A process for recovering oil floating on water comprising:
(a) forming a plurality of sacks of two sheets of a mesh material that is porous to both water and oil, which sheets are affixed together and stiffened around their perimeter to form a single compartment;
(b) partially filling each of the sacks with a multitude of tubular bodies comprised of an oil-entrapping polymer, each of which bodies surrounds an axial hole of the polymer body and has its longest dimension parallel to the axial hole;
(c) deploying the sacks onto oily water;
(d) maintaining the sacks afloat amidst the oil for a time sufficient to allow the bodies in the sacks to entrap a quantity of the oil; and
(e) retrieving the sacks from the surface of the water at least a day later.

43. The process of claim 42 further comprising moving a boat through the water, which boat supports a pair of wings positioned at a forward angle from sides of the boat, thereby funneling the sacks next to the sides of the boat.

44. The process of claim 43 further comprising using an airstream induction system supported by the boat to retrieve at least some of the sacks next to at least one side of the boat.

45. The process of claim 44 further comprising retrieving others of the sacks next to at least one side of the boat manually.

46. The process of claim 45 wherein the act of manual retrieval comprises:
(a) conveying the sacks not retrieved by the airstream induction system, after they are funneled next to the sides of the boat, up a ramp;
(b) connecting a quantity of the sacks together with a line; and
(c) returning the resulting string of sacks to the surface of the water.

47. The process of claim 42 wherein retrieving the sacks comprises conveying sacks up a ramp next to a side of the boat.

48. The process of claim 47 further comprising thereafter connecting a quantity of the sacks together and returning the resulting string of sacks to the surface of the water.

49. The process of claim 48 further comprising burning the strings of sacks on the surface of the water.

50. The process of claim 48 further comprising later retrieving the strings of sacks from the surface of the water.

51. The process of claim 50 further comprising later incinerating the sacks together with the oil entrapped by the polymer of the bodies and the bodies themselves.

52. The process of claim 50 further comprising later heating the polymer bodies in a reactor to recover hydrocarbons.

53. The process of claim 42 further comprising later incinerating the retrieved sacks together with the oil entrapped by the polymer of the bodies and the bodies themselves.

54. The process of claim 42 further comprising later heating the polymer bodies in a reactor to recover hydrocarbons.

55. The process of claim 42 wherein the act of forming a plurality of sacks comprises folding over both sheets a flexible ring extending around the perimeter of the sheets and affixing the ring to the outside of the sheets, thereby forming the ring into a double layer.

56. The process of claim 55 wherein the act of forming a plurality of sacks comprises forming each sack of two round sheets comprised of a woven polypropylene mesh.

57. The process of claim 42 wherein the act of partially filling each of the sacks comprises placing in each of the sacks a multitude of polymer bodies, each body comprised of SBS and a multitude of inert plastic flakes scattered throughout the body that are wettable with respect to hydrocarbons.

58. The process of claim 42 wherein the act of forming a plurality of sacks further comprises attaching a port to each of the sacks, and wherein partially filling each of the sacks comprises placing the multitude of polymer bodies in the sacks through the ports.

59. The process of claim 42 wherein the act of partially filling each of the sacks comprises placing in each of the sacks a multitude of polymer bodies comprised of EPDM and SBS.

60. The process of claim 59 wherein the act of partially filling each of the sacks comprises placing in each of the sacks a multitude of polymer bodies substantially consisting of SBS and EPDM.

61. The process of claim 60 wherein the act of partially filling each of the sacks comprises placing in each of the sacks a multitude of polymer bodies having external surfaces that contain a multitude of fissures.

62. The process of claim 61 further comprising first forming polymer bodies by low-temperature extrusion, and wherein the act of partially filling the sacks comprises placing a multitude of the resulting, extruded polymer bodies in each of the sacks.

63. A process for recovering oil floating on water comprising:
(a) forming a plurality of sacks of two sheets of a mesh material that is porous to both water and oil, which sheets are affixed together and stiffened around their perimeter;
(b) placing in each of the sacks a multitude of tubular bodies comprised of an oil-entrapping polymer, each of which bodies surrounds an axial hole of the polymer body and has its longest dimension parallel to the axial hole;
(c) deploying the sacks onto oily water;
(d) maintaining the sacks afloat amidst the oil for a time sufficient to allow the bodies in the sacks to entrap a quantity of the oil; and
(e) later burning the floating sacks.

64. The process of claim 63 further comprising, before the act in part (e), securing together a plurality of the sacks.

65. The process of claim 64 wherein the sacks are secured together after entrapping a quantity of oil.

66. The process of claim 65 wherein the sacks are secured together by:
(a) conveying the sacks up a ramp;
(b) connecting a quantity of the sacks together with a line; and
(c) returning the resulting string of sacks to the surface of the water.

67. The process of claim 66 further comprising, before the conveying act, moving through the water a boat that supports a pair of wings positioned at a forward angle from the sides of the boat, thereby funneling the sacks next to the sides of the boat.

68. The process of claim 66 further comprising forming a plurality of strings of sacks, and further comprising later connecting the plurality of strings of sacks together.

69. The process of claim 64 wherein the sacks are secured together before entrapping a quantity of oil.

70. The process of claim 63 wherein the act of forming a plurality of sacks comprises folding over both sheets a flexible ring extending around the perimeter of the sheets and affixing the ring to the outside of the sheets, thereby forming the ring into a double layer.

71. The process of claim 70 wherein the act of forming a plurality of sacks comprises forming each sack of two round sheets comprised of a woven polypropylene mesh.

72. The process of claim 63 wherein the act of placing in each of the sacks a multitude of bodies comprises using polymer bodies comprising SBS and a multitude of substantially flat inert plastic flakes wettable with respect to hydrocarbons.

73. The process of claim 63 further comprising maintaining the sacks afloat amidst the oily water within a surrounding boom.

* * * * *

UNITED STATES PATENT AND TRADEMARK OFFICE
CERTIFICATE OF CORRECTION

PATENT NO.        : 7,229,560 B2
APPLICATION NO. : 11/006354
DATED             : June 12, 2007
INVENTOR(S)       : Glenn R. Rink et al.

It is certified that error appears in the above-identified patent and that said Letters Patent is hereby corrected as shown below:

On Title Page Item 56
Under the References Cited section, insert the following Foreign Patent Documents:
--DE3122219-A1 6/4/81 Germany
  0484061-Al 5/6/92 EPO
  0518336-Al 12/26/92 EPO
  DE 136,162 6/20/79 Germany
  DE 2,904,428 8/14/80 Germany
  DE 3,634,289 4/21/88 Germany
  CH-613245 9/14/79 Switzerland
  DE 3122219 A 1 3/4/82 Germany
  DE 41 36 647 A 1 12/24/92 Germany--

Item 56 Under the References Cited section, insert the following Other Art:
--"Block Copolymers," Polymer Handbook, page 34 (Wiley, 3rd Edition 1989).
"Selection Criteria and Laboratory Evaluation of Oilspill Sorbents," Environmental Protection Series, Report EPS 3/SP/3, pp. 1-73 (June 1991).
"Environmental Spill Encapsulant Polymers," JRM Chemical Form 550 product brochure (August 1993). Rushefsky, "Old Tires Now Can Be Retired," Staten Island Advance (Oct. 22, 1993).
"Titan Tech Attacks Tire Recycling Mess," American Metal Market (Oct. 26, 1993).
Alexander, "Bradley is Center of World Attention this Week" Chickasha Daily Express (Nov. 4, 1993).
"Business & Technology," Solid Waste Report, Vol. 24, No. 43, pg. 346 (Nov. 4, 1993).
"A Cooler Way to Melt Junked Tires," Business Week (Nov. 8, 1993).
Schulman, "A New Spin on Old Tires," Newsweek (Nov. 15, 1993).
"Titan Develops Tyre & Plastics Recycling," HazNews (Dec. 1993).
Kokish, "Titan Opens Pyrolysis Plants in South Korea," Tire Business (Dec. 13, 1993).
Metz, "N.M. Firm is Ready to Roll into the Tire Recycling Industry," The Boston Globe (Dec. 28, 1993).
"High-Tech Breakthroughs," Boardroom Reports (Jan. 1, 1994).
Kansas, "Catalysts and Beams Take Aim at Wastes," The Wall Street Journal (Jan. 21, 1994).--
Under the References Cited section, insert the following Other Art:
--"Recycling News," Green Alternatives, Vol. 4, No. 1 (Feb/March 1994).
"Titan Technologies, Inc.," Conservative Speculator (June 1994).
"Titan Technologies, Inc.," Investor's NewsWire, pg. All (Sept. 9, 1994).
DiChristina, "Mired in Tires," Popular Science (Oct. 1994).
McDonagh, et al., "Handling and Disposal of Oil Waste from Oil Spills at Sea," paper presented at Long Beach Oil Spill Conference (Feb. 27, 1995).
Cassidy, "Titan Potential," MoneyWorld (April 1995), pgs. 18-21.

UNITED STATES PATENT AND TRADEMARK OFFICE
CERTIFICATE OF CORRECTION

| | |
|---|---|
| PATENT NO. | : 7,229,560 B2 |
| APPLICATION NO. | : 11/006354 |
| DATED | : June 12, 2007 |
| INVENTOR(S) | : Glenn R. Rink et al. |

It is certified that error appears in the above-identified patent and that said Letters Patent is hereby corrected as shown below:

Under the References Cited section, insert the following Other Art (cont'd):
Titan Technologies, Inc. Investor's Booklet.
"Petrosorb HGPPL-1 Petroleum Product Spill Encapsulant," Petrosorb product brochure (source and date unknown).
"First in Thirst," Matasorb Industrial Sorbents product brochure (source and date unknown).
Pacific Fluid System, Corp. "Linductor Oil Recovery and Bulk Transfer System Booklet."
"Fact Sheets," Team One USA Challenger Product Information.
Fingas, Mervis F., et al. "The Newfoundland Offshore Burn Experiment-Nobe."
Buist, Ian A., et al. "In-Situ Burning of Alaska North Slope Emulsions,"
Guenette, Chantal, et al. "Studies of In-Situ Burning of Emulsions in Norway."
PCT Int'l Prelim. Exam. Report, S.N. PCT/US98/00385 (5/20/99)
Kristar Enterprises, Fossil Filter, brochure (9/96)
Fam, Sami, Michael K. Stenstron, and Gary Silverman, "Hydrocarbons in Urban Runoff," Journal of Environmental Engineering, Vol. 113, No. 5, October 1987, pp. 1032-1046.
Shepp, David L., "Petroleum Hydrocarbon Concentrations Observed in Runoff from Discrete, Urbanized Automotive-Intensive Land Uses," Watershed '96 Conference Proceedings, pp. 220-223.
Materials re: King County Evaluation of Commercially Available Catch Basin Inserts for Treatment of Stormwater Runoff from Developed Sites, 10/95.
Imtech-Imbibitive Technologies Corporation product literature re "Imbiber Beads," 1993, 1996, 1997.
"HydroCartridges/Rubberizer" product literature, 1994-97.
Aqua Treatment Systems, Inc./"Absorbent W" product literature, 1996-97.--
Item 56 Under the References Cited section, insert the following Other Art:

--"Innovative Stormwater Treatment Products & Services Guide," prepared for the Stormwater Technologies Trade Shows, November 17 & 19, 1997 (discussing several products, some of which were commercially available before September 1997).

UNITED STATES PATENT AND TRADEMARK OFFICE
CERTIFICATE OF CORRECTION

PATENT NO. : 7,229,560 B2  
APPLICATION NO. : 11/006354  
DATED : June 12, 2007  
INVENTOR(S) : Glenn R. Rink et al.

Page 3 of 3

It is certified that error appears in the above-identified patent and that said Letters Patent is hereby corrected as shown below:

Item 56 Under the References Cited section, insert the following Other Art (cont'd):

Suntree Isles, Inc. "Curb Inlet Basket" product literature, 1995-96.
Inventive Resources, Inc. "Water Decontaminator" product literature (4/98). --

Signed and Sealed this

Twenty-third Day of October, 2007

JON W. DUDAS  
*Director of the United States Patent and Trademark Office*